(12) United States Patent
Yamamoto

(10) Patent No.: US 8,743,466 B2
(45) Date of Patent: Jun. 3, 2014

(54) DISPLAY DEVICE AND METHOD FOR FORMING THE SAME

(75) Inventor: Emi Yamamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/703,363

(22) PCT Filed: Jun. 10, 2011

(86) PCT No.: PCT/JP2011/063370
§ 371 (c)(1),
(2), (4) Date: Dec. 11, 2012

(87) PCT Pub. No.: WO2011/158752
PCT Pub. Date: Dec. 22, 2011

(65) Prior Publication Data
US 2013/0088785 A1   Apr. 11, 2013

(30) Foreign Application Priority Data
Jun. 15, 2010   (JP) ................................. 2010-136259

(51) Int. Cl.
*G02B 27/12*   (2006.01)

(52) U.S. Cl.
USPC ........................................................ 359/639

(58) Field of Classification Search
USPC ........................................................ 359/639
See application file for complete search history.

(56) References Cited

U.S. PATENT DOCUMENTS

| | | | | |
|---|---|---|---|---|
| 5,220,462 A | * | 6/1993 | Feldman, Jr. | ................. 359/855 |
| 2003/0064303 A1 | | 4/2003 | Nishimura et al. | |
| 2003/0187119 A1 | | 10/2003 | Nishimura et al. | |
| 2004/0013972 A1 | | 1/2004 | Nishimura et al. | |
| 2006/0007302 A1 | | 1/2006 | Numata et al. | |
| 2007/0183016 A1 | * | 8/2007 | Kamijima et al. | ............ 359/245 |

FOREIGN PATENT DOCUMENTS

| | | |
|---|---|---|
| JP | 07-509327 A | 10/1995 |
| JP | 2002-296402 B2 | 10/2002 |
| JP | 2002-309110 A | 10/2002 |
| JP | 2003-066206 A | 3/2003 |
| JP | 2003-246930 A | 9/2003 |

(Continued)

OTHER PUBLICATIONS

Official Communication issued in International Patent Application No. PCT/JP2011/063370, mailed on Jul. 5, 2011.

*Primary Examiner* — James Jones
(74) *Attorney, Agent, or Firm* — Keating & Bennett, LLP

(57) ABSTRACT

A display device has a display element that makes a display and a viewing angle widening member that is provided on the viewing side of the display element, and that causes light to exit in a condition in which the angle distribution is widened relative to before incidence of the viewing angle widening member to the display element. The viewing angle widening member includes a base material, and a refractive index change layer formed over the base material. The refractive index change layer includes a plurality of high refractive index portions and low refractive index portions having a refractive index that is lower than the refractive index of the high refractive index portions. Each of the plurality of high refractive index portions includes a light emission surface on the base material side, and a light incidence surface having a larger surface area than that of the light emission surface on the opposing side of the base material side. The refractive index change layer faces the display element. The base material is disposed on the display side.

12 Claims, 16 Drawing Sheets

(56) References Cited

FOREIGN PATENT DOCUMENTS

| | | | |
|---|---|---|---|
| JP | 3622201 B2 | 2/2005 |
| JP | 2005-181691 A | 7/2005 |
| JP | 2006-084876 A | 3/2006 |
| JP | 3849134 B2 | 11/2006 |
| JP | 2006-337463 A | 12/2006 |
| JP | 4023078 B2 | 12/2007 |
| JP | 2008-032756 A | 2/2008 |
| JP | 4129991 B2 | 8/2008 |
| JP | 2009-210627 A | 9/2009 |
| WO | 95/01584 A1 | 1/1995 |
| WO | 96/07115 A1 | 3/1996 |

* cited by examiner

DISPLAY DEVICE AND METHOD FOR FORMING THE SAME

TECHNICAL FIELD

The present invention relates to a display device and to a method for forming the display device, and in particular it relates to a display device having a viewing angle widening member for the purpose of widening the viewing angle on the viewing side (display side) and a method for forming the same.

Priority is claimed on Japanese Patent Application No. 2010-136259, filed on Jun. 15, 2010, the content of which is incorporated herein by reference.

BACKGROUND ART

Liquid crystal display devices are widely used as displays in portable electronic devices such as mobile telephones, and in such devices as televisions and personal computers. In general, however, liquid crystal display devices, although they provide good viewability from the front, have been known to have a narrow viewing angle, and efforts have been made to widen the viewing angle, one being a proposal of a polarizer in a waveguide array made of a plurality of tapered waveguides on the light emission side (refer to Patent Reference 1 noted below).

In this polarizer, as shown in FIG. 17, a waveguide array made of a plurality of tapered waveguides 101 is disposed on one surface of a polarizer element 102. Each of the waveguides 101 is made of a resin material having a refractive index of approximately 1.45 to 1.65. Light that is incident from the light incidence surface, on which the surface area of the waveguides 101 is large, is reflected at the side surfaces of the waveguides, and is emitted from the light emission surface that has a small surface area in the condition in which the angle distribution is widened. Therefore, in Patent Reference 1, there is a description to the effect that, by disposing this polarizer on the light emitting surface of a liquid crystal panel, the angle distribution of light emitting from the liquid crystal panel is widened, enabling the image to be viewed from a greater angle.

There also has been a proposal of a refractive index changing composition having radiation sensitivity, for the purpose of forming an optical waveguide or light diffusing sheet or the like having a fine refractive index pattern (refer to Patent Reference 2 noted below). According to the method of forming the refractive index pattern disclosed in this reference, after forming a coating film by coating the solution of the above-noted composition onto a substrate, the coating film is exposed to radiation through, for example, a pattern mask. When this is done, a photochemical reaction is induced in the composition in the regions exposed to the radiation, changing the refractive index and resulting in a difference in refractive index with respect to regions that are not exposed to the radiation. The description notes that the above-noted composition is an optical material such as for optical waveguides, light diffusing sheets and the like.

PRIOR ART DOCUMENTS

Patent Documents

Patent Document 1: Japanese Patent No. 4129991
Patent Document 2: Japanese Patent No. 3622201

SUMMARY OF INVENTION

Problem to be Solved by the Invention

The waveguides that form the waveguide array disclosed in the above-noted Patent Reference 1 are extremely small structures, being on the order of micrometers on one side. For this reason, there is a risk of loss of or damage to the waveguides caused by mechanical shock when they are handled during the process of assembling, for example, a liquid crystal panel. There is also the risk of dust or the like intruding into the gaps between neighboring waveguides, thereby contaminating the waveguide array.

With this waveguide array, therefore, there was the problem of not being able to achieve a sufficient effect of widening the viewing angle, because of not being able to achieve the desired light diffusion characteristics due to loss of or damage to waveguides or the intrusion of dust or the like. Additionally, because of deterioration of the optical characteristics, such as a decrease in the optical reflectivity of the waveguides, with the passage of time, there was the problem of worsening of the viewability of the display.

In Patent Reference 1, there is a description of the formation of a protective layer over the light emitting surface of the waveguide array for the purpose of preventing mechanical loss of or damage to the light emitting surface of the waveguide array. In Patent Reference 1, there is also a description of the attachment of a protective film over the light emitting surfaces of the waveguide array. However, in the case of providing the above-noted protective layer or a protective film, the number of process steps and the number of components increase in the process of forming the waveguide array, this representing a problem of an increase in the manufacturing cost. Also, if a problem occurs, such as not being able to sufficiently planarize the surface of the protective layer, or not being able to attach the protective film uniformly, there is an adverse effect on the optical characteristics of the waveguide array, thereby causing the problem of a worsening of the viewability of the display.

The refractive index changing composition disclosed in Patent Reference 2 contributes to the fabrication of optical elements such as optical waveguides and light diffusing sheets. However, Patent Reference 2 only states that use is possible in optical waveguides and light diffusing sheets having a fine refractive index pattern, and makes no disclosure regarding the specific constitution of the optical waveguides or light diffusing sheets, or of the shape or disposition or the like of the refractive index pattern.

One aspect of the present invention was made to solve the above-noted problems, and has as an object to provide a display device that can exhibit superior display veiwability by constantly maintaining the desired optical characteristics and enabling a stable viewing angle widening effect. Another object is to provide a method for forming a display device that enables easy forming of this type of display device by a simple method.

Means for Solving the Problem

In order to achieve the above-noted objects, a display device according to one aspect of the present invention includes a display element that makes a display and a viewing angle widening member that is provided on a viewing side of the display element, and that causes light to exit in a condition in which the angle distribution is widened relative to before incidence of the viewing angle widening member to the display element. The viewing angle widening member includes a base material, and a refractive index change layer formed over the base material. The refractive index change layer includes a plurality of high refractive index portions that have a light emission surface on the base material side and that have a light incidence surface on the side opposite from the base material side with a surface area that is larger than that the light emission surface and a low refractive index portion having a refractive index that is lower than the refractive index of the high refractive index portions. The viewing angle widening member is disposed on the viewing side of the display element so that the refractive index change layer faces the display element and the base material faces the viewing side.

In the display device according to one aspect of the present invention, a planar disposition of the plurality of high refractive index portions as seen from the normal line direction of the refractive index change layer may be random.

In the display device according to one aspect of the present invention, of the plurality of high refractive index portions in the refractive index change layer, the angle of inclination of a side surface of at least one the high refractive index portions may be different than the angle of inclination of the other side surfaces of the high refractive index portions.

In the display device according to one aspect of the present invention, the display element may include a plurality of pixels that form a displayed image. The plurality of high refractive index portions may be disposed over the surface of the refractive index change layer with a uniform spacing. The pitch of the high refractive index portions in the refractive index change layer may be smaller than the pitch of the pixels of the display element. Alternatively, the display element may have a plurality of pixels that form a displayed image. The plurality of high refractive index portions may be disposed randomly over the surface of the refractive index change layer. The maximum pitch of the high refractive index portions in the refractive index change layer may be smaller than the pitch of the pixels in the display element.

In the display device according to one aspect of the present invention, a planar shape of the high refractive index portions as seen from the normal line direction of the refractive index change layer may be circular or polygonal.

In the display device according to one aspect of the present invention, depressions, the inner surfaces of which are curved surfaces, or protrusions, the surfaces of which are curved surfaces may be formed on one surface of the base material corresponding to the positions of the light emission surface of the high refractive index portions. The light emission surfaces of the high refractive index portions may have curved convex surfaces or curved concave surfaces that reflect the shape of the depressions or the protrusions.

The display device according to one aspect of the present invention may include an information input device on the viewing side of the viewing angle widening member.

In the display device according to one aspect of the present invention, the base material may serve also as the base material of the information input device.

In the display device according to one aspect of the present invention, at least one of an anti-reflection layer, a polarizing filter layer, an anti-static layer, an anti-glare treated layer, and an anti-contamination treated layer may be provided on the viewing side of the base material.

A method for forming a display device according to one aspect of the present invention includes a step of forming on one surface of a base material a coating film made of a refractive index changing composition that has photosensitivity, and that changes its refractive index by being radiated with light; a step of selectively radiating light onto a part of the coating film to change the refractive index of the coating film in the exposed regions and cause the refractive index in the exposed regions and the unexposed regions to be different, so as to form on one surface of the base material a refractive index change layer having high refractive index portions and a low refractive index portion, so as to form a viewing angle widening member made of the base material and the refractive index change layer; and a step of disposing the viewing angle widening member over the display element in the condition in which the refractive index change layer side is caused to oppose the display element, with the base material side facing the display side.

In the method for forming the display device according to one aspect of the present invention, when radiating the light, the refractive index changing composition that is used may be a composition having characteristics wherein the refractive index of an exposed region is higher than the refractive index of an unexposed region.

Effect of Invention

According to the display device of one aspect of the present invention, it is possible to obtain a display device that exhibits superior display viewability by constantly maintaining the desired optical characteristics and enabling a stable viewing angle widening effect. Also, according to the method for forming a display device of one aspect of the present invention, it is possible, by a simple forming method, to provide a display device that can reliably exhibit the effect of a widened viewing angle.

DESCRIPTION OF EMBODIMENTS

[First Embodiment]

The first embodiment of the present invention will be described below, with references made to FIG. 1 to FIG. 7.

In this embodiment, the description is of an example of a liquid crystal display device having a light-transmissive type liquid crystal panel as a display element.

In all of the following drawings, to make the constituent elements easy to see, the scale will be different, depending on the constituent element.

Figure 1:
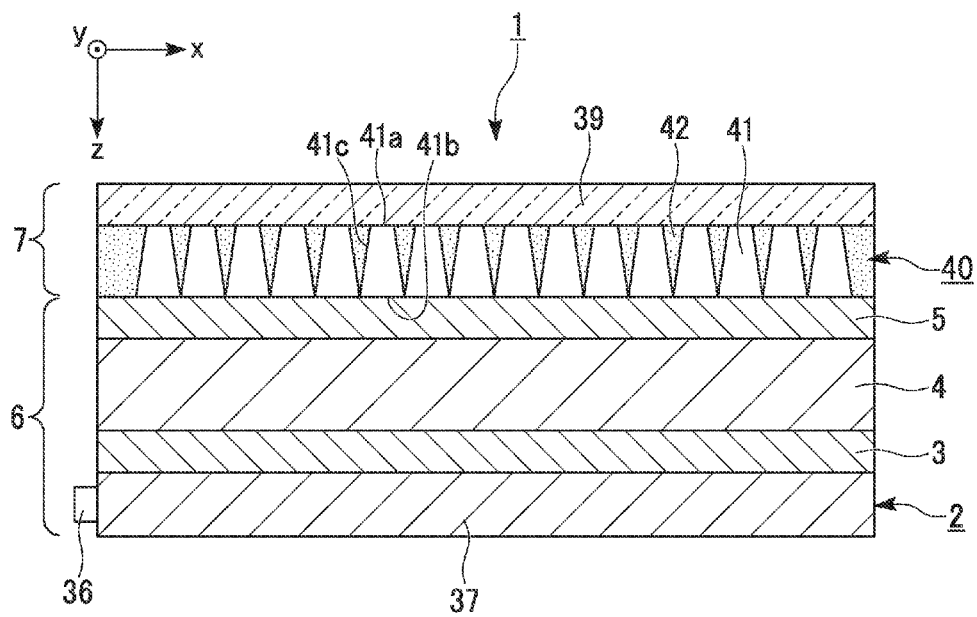
FIG. 1 is a vertical cross-sectional view illustrating a liquid crystal display device according to a first embodiment of the present invention.

As shown in FIG. 1, a liquid crystal display device 1 (display device) of the present embodiment is constituted by a liquid crystal display element 6 (display element) including a backlight 2, a first polarizing sheet 3, a liquid crystal panel 4, and a second polarizing sheet 5, and a viewing angle widening film 7 (viewing angle widening member). In FIG. 1, although the liquid crystal panel 4 is shown in schematic form to be one sheet, the detailed constitution thereof will be described later. An observer views the display from above the liquid crystal display device 1 as it is shown in FIG. 1, at which there is disposed a viewing angle widening film 7. In the description to follow, therefore, the side on which the viewing angle widening film 7 is disposed will be called the viewing side (display side), and the side on which the backlight 2 is disposed will be called the rear side.

In the liquid crystal display device 1 of the present embodiment, light that is emitted from the backlight 2 is modulated by the liquid crystal panel 4, and the modulated light displays prescribed graphics and characters or the like. Also, when the light exiting from the liquid crystal panel 4 passes through the viewing angle widening film 7, the light exits from the viewing angle widening film 7 in the condition in which the angle distribution is widened relative to before entering the viewing angle widening film 7. The result is that the observer can view the display with a widened viewing angle.

The specific constitution of the liquid crystal panel 4 will be described below.

In this case, an example of a transmissive-type of liquid crystal panel of the active matrix type will be described. The liquid crystal panel that can be applied to the present embodiment is not restricted to an active matrix transmission-type liquid crystal panel. The liquid crystal panel that can be applied to the present embodiment may be, for example, a semi-transmission type (combined transflective type) liquid crystal panel or a reflective-type liquid crystal panel. Additionally, the panel may be a simple matrix type liquid crystal panel in which each pixel does not have a switching thin film transistor (TFT).

Figure 2:
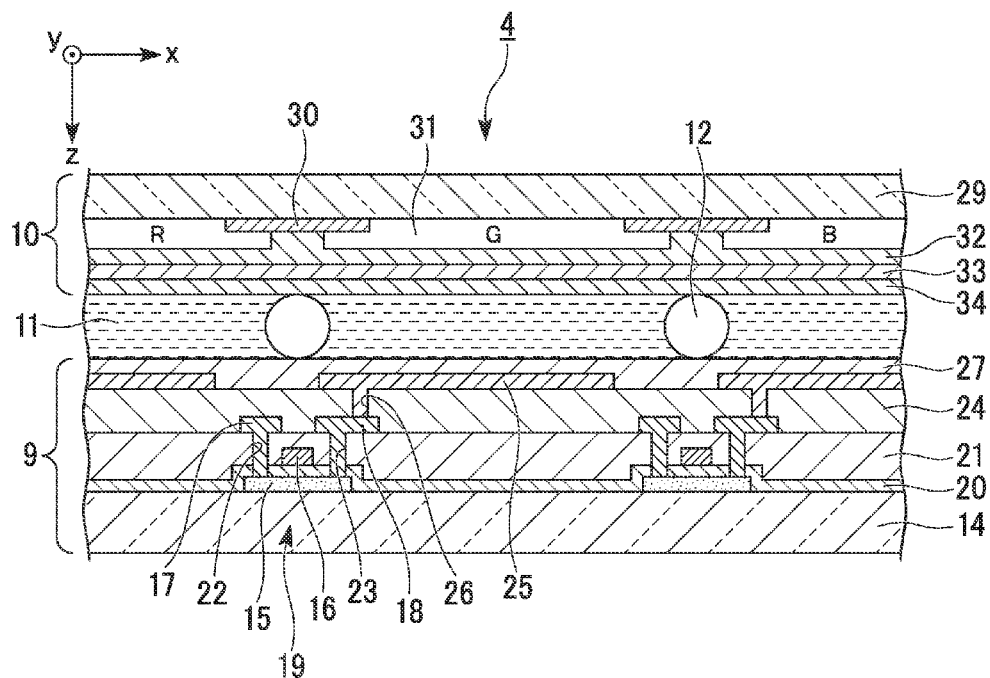
FIG. 2 is a vertical cross-sectional view illustrating a liquid crystal panel in the liquid crystal display device according to the first embodiment of the present invention.

The liquid crystal panel 4, as shown in FIG. 2, has a TFT substrate 9, a color filter substrate 10 that is disposed in opposition to the TFT substrate 9, and a liquid crystal layer 11. The TFT substrate 9 is provided as a switching element substrate. The color filter substrate 10 is disposed in opposition to the TFT substrate 9. The liquid crystal layer 11 is sandwiched between the TFT substrate 9 and the color filter substrate 10. The liquid crystal 11 is sealed into a space that is surrounded by the TFT substrate 9, the color filter substrate 10, and a frame-like sealing member (not shown) that attaches the TFT substrate 9 and the color filter substrate 10 together, with a prescribed spacing therebetween. The liquid crystal panel 4 of the present embodiment makes a display in, for example, the VA (vertical alignment) mode. A vertical aligned liquid crystal having a negative dielectric constant anisotropic index is used as the liquid crystal layer 11. Spherically shaped spacers 12 are disposed between the TFT substrate 9 and the color filter substrate 10, so as to maintain a constant spacing between these substrates. With regard to the display mode, there is no restriction to the above-noted VA mode, and the TN (twisted nematic) mode, the STN (super twisted nematic) mode, and the IPS (in-plane switching) mode and the like can also be used.

A plurality of pixels (not shown), which are the smallest unit region of the display are disposed on the TFT substrate 9 in a matrix arrangement. A plurality of source bus lines (not shown) are formed on the TFT substrate 9 so as to be mutually parallel. A plurality of gate bus lines (not shown) are also formed on the TFT substrate 9 so as to extend mutually parallel and also perpendicular to the plurality of source bus lines. A plurality of source bus lines and a plurality of gate bus lines are, therefore, formed on the TFT substrate 9 in a matrix arrangement, a rectangular region that is partitioned by neighboring source bus lines and neighboring gate bus lines being one pixel. The source bus lines are connected to the source electrodes of the TFTs, to be described later, and the gate bus lines are connected to the gate electrodes of the TFTs.

The transparent substrate 14 that constitutes the TFT substrate 9 has TFTs 19 formed on the surface thereof that is on the liquid crystal layer 11 side. A TFT 19 includes a semiconductor layer 15, a gate electrode 16, a source electrode 17, and a drain electrode 18, and the like. A glass substrate, for example, can be used as the transparent substrate 14. A semiconductor layer 15 made of a semiconductor material, for example, CGS (continuous grain silicon), LPS (low-temperature polysilicon), or α-Si (amorphous silicon) or the like is formed over the transparent substrate 14. A gate insulating film 20 is formed over the transparent substrate 14 so as to cover the semiconductor layer 15. A silicon oxide film, a silicon nitride film, or a laminate of these is used as the material of the gate insulating film 20.

A gate electrode 16 is formed over the gate insulating film 20, so as to oppose the semiconductor layer 15. A W (tungsten)/TaN (tantalum nitride) laminated film, Mo (molybdenum), Ti (titanium), or Al (aluminum) or the like can be used as the material of the gate electrode 16.

A first interlayer insulating film 21 is formed over the gate insulating film 20, so as to cover the gate electrode 16. A silicon oxide film, a silicon nitride film, or a laminate thereof, or the like, for example, can be used as the material for the first interlayer insulating film 21. The source electrode 17 and the drain electrode 18 are formed over the first interlayer insulating film 21. The source electrode 17 is connected to the source region of the semiconductor layer 15, via a contact hole 22 that passes through the first interlayer insulating film 21 and the gate insulating film 20. In the same manner, the drain electrode 18 is connected to the drain region of the semiconductor layer 15, via a contact hole 23 that passes through the first interlayer insulating film 21 and the gate insulating film 20. The same type of conductive material as the above-described gate electrode 16 can be used as the material of the source electrode 17 and the drain electrode 18. A second interlayer insulating film 24 is formed over the first interlayer insulating film 21, so as to cover the source electrode 17 and the drain electrode 18. The same type of material as used for the above-described first interlayer insulating film 21 or an organic insulating material can be used as the material of the second interlayer insulating film 24.

A pixel electrode 25 is formed over the second interlayer insulating film 24. The pixel electrode 25 is connected to the drain electrode 18, via a contact hole 26 that passes through the second interlayer insulating film 24. The pixel electrode 25 is, therefore, connected to the drain region of the semiconductor layer 15, with the drain electrode 18 as a relay electrode. A transparent conductive material such as ITO (indium tin oxide), IZO (indium zinc oxide), or the like is used as the material of the pixel electrode 25. By virtue of this constitution, a scanning signal is supplied via the gate bus line, and, when the TFT 19 goes into the on state, an image signal supplied to the source electrode 17 via the source bus line is supplied to the pixel electrode 25 via the semiconductor layer 15 and the drain electrode 18. An orientation film 27 is formed over the entire surface over the second interlayer insulating film 24, so as to cover the pixel electrodes 25. This orientation film 27 has orientation controlling ability that causes vertical alignment of the liquid crystal molecules that constitute the liquid crystal layer 11.

A black matrix 30, color filters 31, a planarization layer 32, an opposing electrode 33, and an orientation film 34 are successively formed on the surface of the liquid crystal layer 11 side of the transparent substrate 29 that constitutes color filter substrate 10. The black matrix 30 has the function of blocking the passage of light between display regions, and is formed by a metal such as Cr (chromium) or the like. The color filters 31 include each of the colors red (R), green (G), and blue (B). Disposition is done so that one of the R, G, and B color filters 31 is disposed over one pixel electrode 25 on the TFT substrate 9. The planarization layer 32 is constituted by an insulating film that covers the black matrix 30 and the color filters 31. The planarization layer 32 achieves planarization by alleviating the steps formed between the black matrix 30 and the color filters 31. The opposing electrode 33 is formed over the planarization layer 32. The same type of transparent conductive material as used for pixel electrodes 25 is used as the material of the opposing electrode 33. An orientation film 34 having vertical alignment control ability is formed over the entire surface of the opposing electrode 33.

As shown in FIG. 1, the backlight 2 has a light source 36 such as a light-emitting diode and a cold cathode tube, and a light-guiding plate 37 that uses internal reflection of light emitted from the light source 36 to emit light toward the liquid crystal panel 4. It is desirable that a backlight that has directivity that controls the direction of emission of light, that is, a directional backlight, be used as the backlight 2 in the present embodiment.

By using a directional backlight that causes collimated or substantially collimated light to be incident to the high refractive index portions of the viewing angle widening film 7, which is described later, it is possible to reduce blur, and further increase the rate of utilization of light. The above-noted directional backlight can be implemented by optimizing the shape, disposition and the like of the reflective pattern formed within light-guiding plate 37. A first polarizing sheet 3 that functions as a polarizer is provided between the backlight 2 and the liquid crystal panel 4. A second polarizing sheet 5 that functions as a light sensor is provided between the liquid crystal panel 4 and the viewing angle widening film 7.

The viewing angle widening film 7 will be described in detail below.

Figure 3:
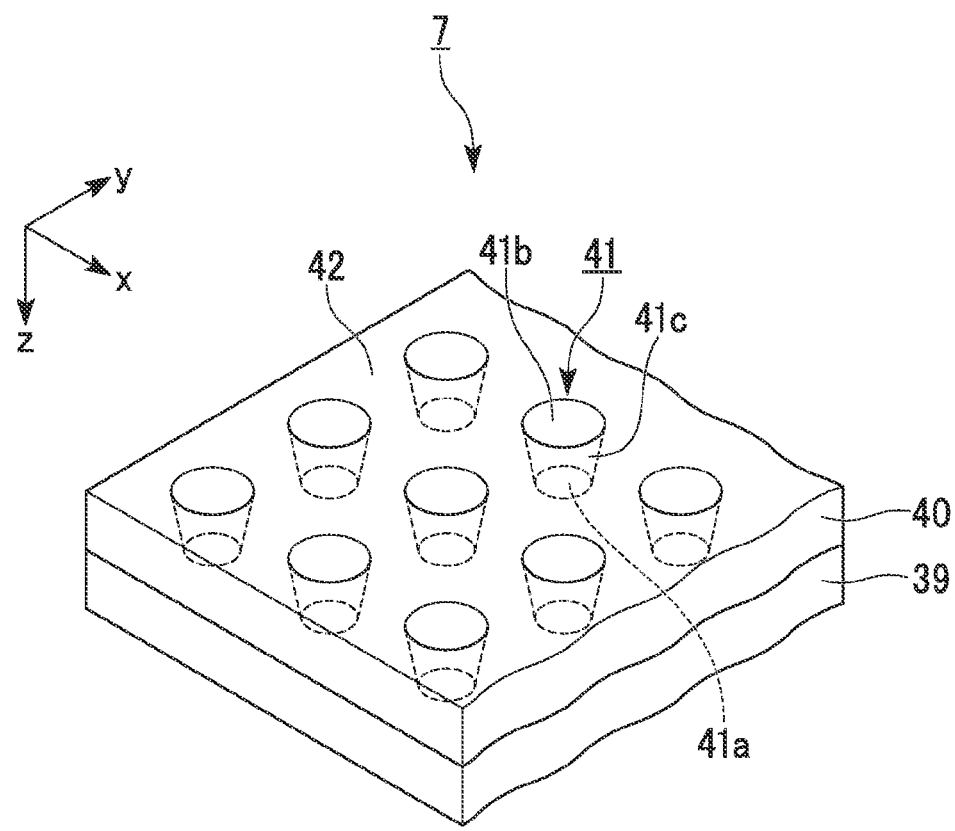
FIG. 3 is a perspective view illustrating a viewing angle widening film in the liquid crystal display device according to the first embodiment of the present invention.

As shown in FIG. 3, the viewing angle widening film 7 is constituted by a base material 39 and a refractive index change layer 40 that is formed over the base material 39. As shown in FIG. 1, the viewing angle widening film 7 is disposed over the second polarizing sheet 5, so that the refractive index change layer 40 side thereof faces the second polarizing sheet 5, and the base material 39 side thereof faces the viewing side. It is preferable that a transparent resin base material of, for example, triacetyl cellulose (TAC) film, or polyethylene terephthalate (PET) or the like be used as the base material 39. The base material 39, in the formation process to be described later, serves as the underlayer when coating the solution of the refractive index changing composition that later becomes the refractive index change layer 40. Thus, the base material 39 needs to have resistance to heat and mechanical strength in the heat treating process step as part of the manufacturing process. Therefore, in addition to a resin base material, a base material made of glass or the like may be used, and it is preferable that the thickness thereof be thin, to the extent that the resistance to heat and mechanical strength is not lost. The reason for this is that the thicker the base material 39 becomes, the greater is the risk of the display blurring. In the present embodiment, as an example, a transparent resin base material with a thickness of 100 μm is used.

The refractive index change layer 40 is made of an organic material to be described later. The refractive index change layer 40 has, as shown in FIG. 3, a plurality of high refractive index portions 41 and a low refractive index portion 42, which corresponds to parts other than the plurality of high refractive index portions 41. The horizontal cross-section shape (the xy cross-section) of the high refractive index portions 41 is circular. The surface area of the base material 39 sides of the high refractive index portions 41 is small and the surface area on the sides opposite from the base material 39 is large. The surface area of the horizontal cross-section of the high refractive index portions 41 gradually increases, going from the base material 39 side toward the side opposite from the base material 39. That is, the high refractive index portions 41 have a shape that is a so-called reverse-tapered circular conical frustums. The high refractive index portions 41 are parts that contribute to the passage of light in the refractive index change layer 40. That is, light that is incident to the refractive index change layer 40 is totally reflected at the tapered side surfaces of the high refractive index portions 41, while being light-guided in the condition of being substantially confined within the inside of the high refractive index portions 41 and exiting therefrom. In the present embodiment, the plurality of high refractive index portions 41, as shown in FIG. 3, are arranged with a prescribed uniform spacing therebetween along the x axis and the y axis, which are mutually perpendicular. The x axis is defined as the horizontal direction of a screen of the liquid crystal panel 4, the y axis is defined as the vertical direction of the screen of the liquid crystal panel 4, and the z axis is defined as the thickness direction of the liquid crystal display device 1.

The low refractive index portion 42 is formed so as to bury the parts other than the high refractive index portions 41, so that the refractive index change layer 40 is overall planar. In the present embodiment, the expressions "high refractive index portions" and "low refractive index portion" are not defined in terms of the absolute values of the refractive index. Of two regions that have different refractive indices in the refractive index change layer 40, the relatively high refractive index parts are defined as the "high refractive index portion" and the relative low refractive index part is defined as the "low refractive index portion." In the present embodiment, as one example, the refractive index of the high refractive index portions 41 is approximately 1.75, and the refractive index of the low refractive index portion 42 is approximately 1.55. It is desirable that the refractive index of the base material 39 be substantially the same as the refractive index of the high refractive index portions 41. The reason for this is that if, for example, the refractive index of the base material 39 is close to the refractive index of the low refractive index portion 42, when light is incident from the high refractive index portions 41, refraction and reflection of unwanted light occurs at the boundary between the high refractive index portions 41 and the base material 39, so that there is a risk of problems such as not being able to achieve the desired viewing angle or a reduction in the amount of exiting light.

The viewing angle widening film 7, as shown in FIG. 1, is disposed so that the base material 39 faces the viewing side. Therefore, if the viewing side is the upper side in the drawing, the disposition is with an attitude that is reversed by 180° from the attitude in FIG. 3. Thus, of the two opposing surfaces of the high refractive index portions 41 that are the shape of circular conical frustums, the surface with the smaller surface area is the light emission surface 41a and the surface with the larger surface area is the light incidence surface 41b.

Examples of dimensions of various parts of the viewing angle widening film 7 in the present embodiment are as follows. The diameter of the light incidence surface 41b of the high refractive index portions 41 is approximately 15 μm, the diameter of the light emission surface 41a thereof is approximately 13.2 μm, the angle of inclination (angle formed between the light emission surface 41a and the side surface 41c) of the high refractive index portions 41 of the side surface 41c is approximately 80°, the distance between two neighboring light incidence surfaces 41b is approximately 15 μm, and the film thickness of the refractive index change layer 40 is 5 μm. In this case, the "side surface of the high refractive index portion 41" means a "boundary between the high refractive index portion 41 and the low refractive index portion 42". Also, with regard to the film thickness of the refractive index change layer 40, similar to the thickness of the base material 39, from the standpoint of preventing blurring of the display, it is desirable that the thickness be thin, to the extent that the effect of widening the viewing angle is not lost.

Although, as one example, the angle of inclination of the side surface 41c of the high refractive index portions 41 is made approximately 80°, there is no particular restriction. The angle formed between the side surface 41c of the high refractive index portions 41, that is, the boundary between the high refractive index portions 41 and the low refractive index portion 42 in the refractive index change layer 40, and the light incidence surface 41a can be made an angle that enables sufficient diffusion of incident light. As shown in FIG. 4B, the angle formed between the inclined surface of the side surface 41c of the high refractive index portion 41 and the light emission surface 41a is set to an angle of θ' (in units of degrees (°)) that exceeds the critical angle with respect to the normal line CL of the side surface 41c of the high refractive index portions 41, so that there is total reflection of light incident in a direction that is parallel or is substantially parallel with the optical axis OA. Also, the angle θ formed between the side surface 41c of the high refractive index portions 41 and the light emission surface 41a that intersects perpendicularly with the optical axis OA can be expressed as the angle QRP as noted below. In this case, the point of intersection of the side surface 41c of the high refractive index portion 41 with the light emission surface 41a is taken as point P, the point of incidence of incident light VR that is parallel to the optical axis OA to the low refractive index portion 42 is taken as point Q, and the point of intersection of the light emission surface 41a of the vertical line of the vertical lines perpendicular to the light emission surface 41a that passes through the point Q is taken as point R. Given this, because the value of the angle PQR is $(90-\theta)°$, the angle of inclination θ of the side surface 41c of the high refractive index portion 41 is the same angle as the incidence angle θ' of the incident light VR at the point Q. Therefore, the angle of inclination θ of the side surface 41c of the high refractive index portion 41 is formed to be an angle that exceeds the above-noted critical angle.

Figure 4A:
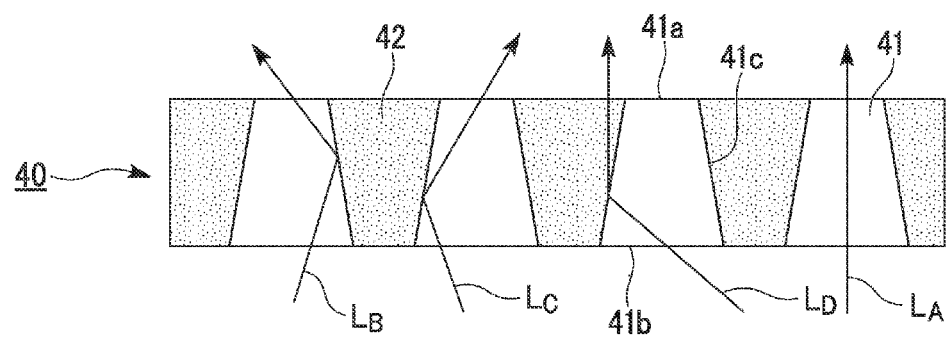
FIG. 4A is a drawing for describing the detailed constitution of the viewing angle widening film according to the first embodiment of the present invention.
Figure 4B:
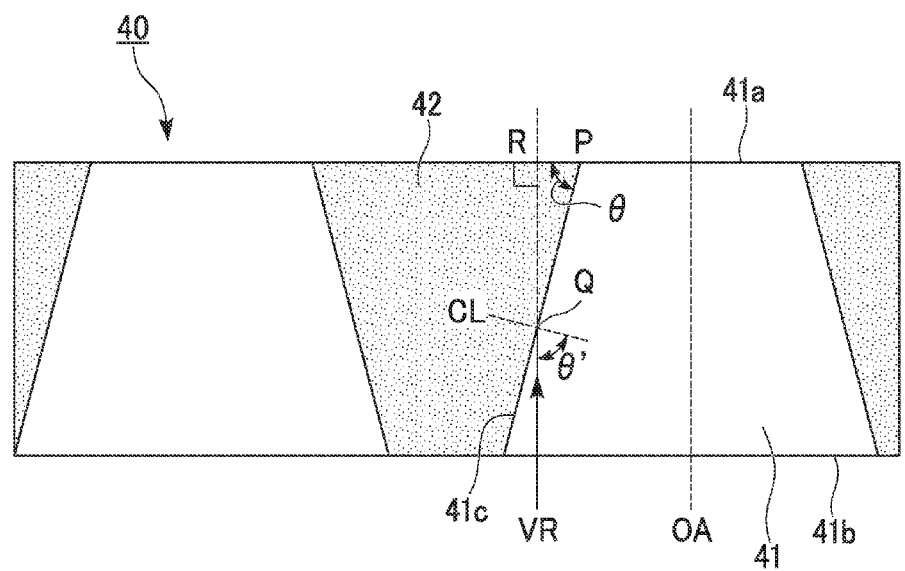
FIG. 4B is a drawing for describing the detailed constitution of the viewing angle widening film according to the first embodiment of the present invention.

As shown by the arrows LB and LC in FIG. 4A, incident light at an angle that exceeds the critical angle is totally reflected and passes through the high refractive index portion 41, so as to be emitted toward the observer side. As shown by the arrow LA in FIG. 4A, incident light that does not strike the low refractive index portion and passes through the refractive index change layer 40 passes as is through the high refractive index portion 41 and is emitted toward the observer side. In contrast, as shown by the arrow LD in FIG. 4A, incident light that is incident at an angle that is smaller than the critical angle, is not totally reflected, passes through the boundary between the high refractive index portion 41 and the low refractive index portion 42, and is emitted from the low refractive index portion toward the observer side. When an observer views this light that is emitted from the low refractive index portion 42 toward the observer side, the frontal contrast decreases and the image is blurred. Given this, in the liquid crystal display device 1 of the present embodiment, it is preferable to use a backlight having directivity that emits light at an angle that is not incident to the refractive index change layer 40 at an angle smaller than the critical angle.

The refractive index change layer 40 is made by coating onto a surface of the base material 39 a solution that includes a refractive index changing composition made of an organic material, followed by drying and hardening. The following two types of refractive index changing compositions are known. One is a type in which, upon selective radiation by light, the refractive index in the exposed region changes in the direction of being higher than the refractive index in the unexposed region. Another is a type in which the refractive index in the exposed region changes in the direction of being lower than the refractive index in the unexposed region. The present embodiment uses the former type. The reason for this is that it is necessary to form so-called reverse-tapered refractive index high refractive index portions 41, in which the light incidence surface 41b on the reverse side from the base material 39 is larger than the light emission surface 41a on the base material 39 side. Given this, in the case of using the former type of refractive index changing composition, because the refractive index in the exposed region becomes greater than the refractive index in the unexposed region, when radiating light from the coating film side of the refractive index changing composition, by using the phenomenon of the light being gradually absorbed and attenuated in the refractive index changing composition going from the surface side of the coating film toward the base material 39 side, it is easy to form the reverse-tapered high refractive index portions 41. The specific material of the refractive index changing composition will be described later.

Next, the method for forming a liquid crystal display device 1 having the above-noted constitution will be described, with references made to FIG. 5 to FIG. 7.

In the following, the description will focus on the process for forming the viewing angle widening film 7 and the process for attaching the viewing angle widening film 7 to the liquid crystal display element 6.

The process for forming the liquid crystal display element 6 will be simply described. First, a TFT substrate 9 and a color filter substrate 10 are each fabricated. After that, the TFT substrate 9 and the color filter substrate 10 are disposed so that the surface of the TFT substrate 9 on the side on which the TFTs 19 are formed is in opposition to the surface of the color filter substrate 10 on which the color filters 31 are formed, the TFT substrate 9 and the color filter substrate 10 being attached together with a sealing member therebetween. After that, a liquid crystal is injected into the space surrounded by the TFT substrate 9, the color filter substrate 10, and the sealing member. Then, an optical adhesive or the like is used to adhere to both surfaces of the liquid crystal panel 4 formed in this manner a first polarizing sheet 3 and a second polarizing sheet 4. The above process completes the liquid crystal display element 6.

Because the method for forming the TFT substrate 9 and the color filter substrate 10 uses a conventional publicly known method, the description thereof will be omitted.

Figure 5:
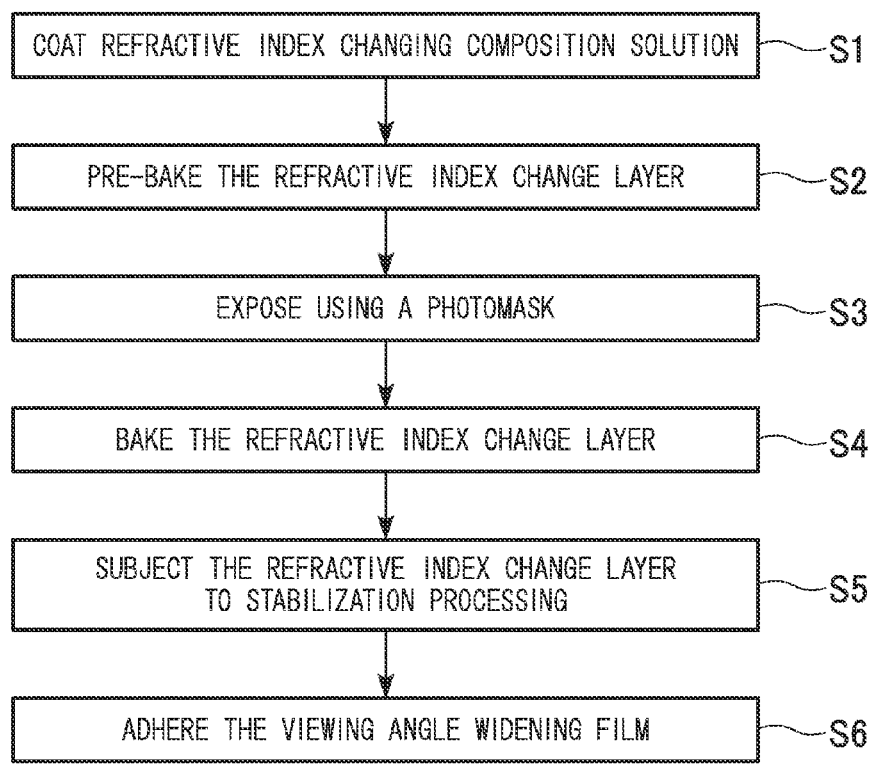
FIG. 5 is a process flowchart showing a method for forming a liquid crystal display device according to the first embodiment of the present invention.
Figure 6A:
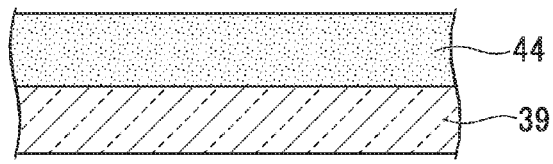
FIG. 6A is vertical cross-sectional view illustrating the formation process for the liquid crystal display device according to the first embodiment of the present invention.

First, as shown in FIG. 6A, spin coating is used to coat an appropriate amount of a solution of a refractive index changing composition onto one surface of a base material 39 made of a transparent resin with a thickness of 100 μm, thereby forming the coating film 44 (step S1 in FIG. 5).

Next, the base material 39 onto which the above-noted coating film 44 is formed is placed on a hotplate, and prebaked for 2 minutes at a temperature of 90° C. (step S2 in FIG. 5). By doing this, the solvent part of the refractive index changing composition solution volatizes, leaving a coating film of the refractive index changing composition having a film thickness of 5 μm.

The specific material of the refractive index changing composition used in the above-noted coating process step includes (A) a decomposable compound, (B) a non-decomposable component that includes inorganic oxide particles, and (C) a radiation sensitive decomposing agent, wherein the above-noted decomposable compound (A) is either at least one type of acid decomposable compound selected from the groups consisting of the structures represented by the following general formulas (1) to (6) and (10) or at least one type of base radical decomposable compounds selected from the group consisting of the structures represented by the following general formulas (11) to (14) and wherein the above-noted non-decomposable component that includes inorganic oxide particles (B) can be a radiation-sensitive refractive index changing composition made of either inorganic oxide particles or inorganic oxide particles and a binder component that exhibits stability with respect to an acid or base radical.

[Chemical Formula 1]

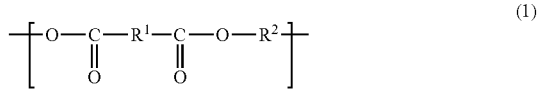

(1)

(In the chemical formula (1), $R^1$ is an alkylene group, perfluoroalkylene group, alkylsilylene group, alkylene-arylene-alkylene group, or arylene group, and R2 is an alkylene group, perfluoroalkylene group, alkylene-arylene-alkylene group, arylene group, alkylsilylene group, or alkylgermylene group, and the above noted alkylene group or perfluoroalylene group may contain a —O—, —CO—, —COO— or —OCOO— bond.)

[Chemical Formula 2]

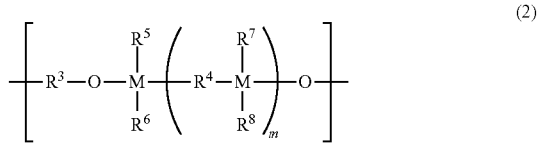

(2)

(In the chemical formula (2), M is Si or Ge, $R^3$ is an alkylene group, perfluoroalkylene group, alkylene-arylene-alkylene group, arylene group, alkylsilylene group, alkylgermylene group, or a single bond, $R^4$ is an oxygen atom, alkylene group, perfluoroalkylene group, alkylene-arylene-alkylene group, arylene group, alkylsilylene group, or a single bond, $R^5$, $R^6$, $R^7$ and $R^8$ are each independently a hydrogen atom, alkyl group, aryl group, alkoxyl group, thioalkyl group, alkoxyester group, perfluoroalkyl group, perfluoroalkoxyl group, perfluoroalkoxyester group, or perfluoroaryl group, and m is an integer of 0 to 2, and the above-noted alkylene group or perfluoroalkylene group may contain a —O—, —CO—, —COO— or —OCOO— bond.)

[Chemical Formula 3]

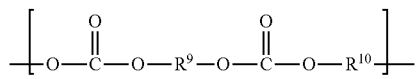
(3)

(In the chemical formula (3), $R^9$ and $R^{19}$ are each independently an alkylene group, perfluoroalkylene group, alkylene-arylene-alkylene group, arylene group, alkylsilylene group, or alkylgermylene group, and the above noted alkylene group or perfluoroalkylene group may contain a —O—, —CO—, —COO— or —OCOO— bond.)

[Chemical Formula 4]

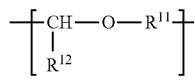
(4)

(In the chemical formula (4), $R^{11}$ is an oxyalkylene group or a single bond, and $R^{12}$ is a hydrogen atom, alkyl group, alkoxyl group, alkoxyester group, perfluoroalkyl group, perfluoroalkoxyester group, perfluoroaryl group, alkylene-arylene-alkylene group, or aryl group.)

[Chemical Formula 5]

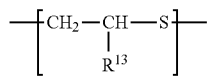
(5)

(In the chemical formula (5), $R^{13}$ is a hydrogen atom, alkyl group, alkoxyl group, alkoxyester group, perfluoroalkyl group, perfluoroalkoxyl group, perfluoroalkoxyester group, perfluoroaryl group, or aryl group.)

[Chemical Formula 6]

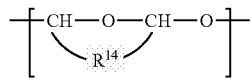
(6)

(In the chemical formula (6), $R^{14}$ is an alkylene group or a structure represented by the following formula (7), (8), or (9).)

[Chemical Formula 7]

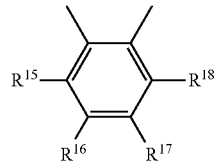
(7)

(In the chemical formula (7), $R^{15}$, $R^{16}$, $R^{17}$, and $R^{18}$ are each independently a hydrogen atom, chain alkyl group having 1 to 6 carbon atoms, chlorine atom, bromine atom, iodine atom, hydroxyl group, mercapto group, carboxyl group, alkoxyl group having 1 to 6 carbon atoms, alkylthio group having 1 to 6 carbon atoms, alkyl halide group having 1 to 6 carbon atoms, alkoxyl halide group having 1 to 6 carbon atoms, alkylthio halide group having 1 to 6 carbon atoms, hydroxyalkyl group having 1 to 6 carbon atoms, mercaptoalkyl group having 1 to 6 carbon atoms, hydroxyalkoxyl group having 1 to 6 carbon atoms, mercaptoalkylthio group having 1 to 6 carbon atoms, aryl group having 6 to 10 carbon atoms, or aralkyl group having 7 to 11 carbon atoms.)

[Chemical Formula 8]

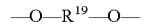
(8)

(In the chemical formula (8), $R^{19}$ is an alkylene group.)

[Chemical Formula 9]

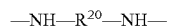
(9)

(In the chemical formula (9), $R^{20}$ is an alkylene group.)

[Chemical Formula 10]

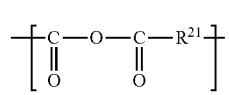
(10)

(In the chemical formula (10), $R^{21}$ is an alkylene group, alkylene-arylene-alkylene group, or arylene group.)

[Chemical Formula 11]

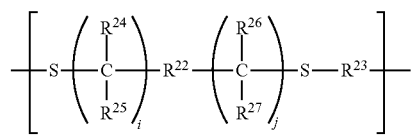
(11)

(In the chemical formula (11), $R^{22}$ is an alkylene group, aralkylene group or arylene group, $R^{23}$ is an alkylene group, aralkylene group, arylene group, alkylene-arylene-alkylene group, alkylsilylene group or alkylgermylene group, $R^{24}$, $R^{25}$, $R^{26}$, and $R^{27}$ are each independently a hydrogen atom, alkyl group, aryl group, alkoxyl group, or thioalkyl group, and i and j are each independently 0 or 1.)

[Chemical Formula 12]

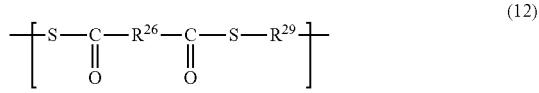

(12)

(In the chemical formula (12), $R^{28}$ is an alkylene group, aralkylene group, or arylene group, and $R^{29}$ is an alkylene group, aralkylene group, arylene group, alkylene-arylene-alkylene group, alkylsilylene group, or alkylgermylene group.)

[Chemical Formula 13]

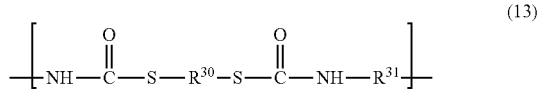

(13)

(In the chemical formula 13, $R^{30}$ and $R^{31}$ are each independently an alkylene group, aralkylene group, arylene group, alkylene-arylene-alkylene group, alkylsilylene group, or alkylgermylene group.)

[Chemical Formula 14]

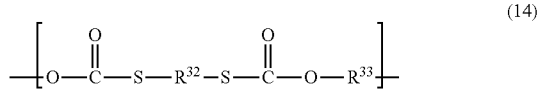

(14)

(In the chemical formula (14), $R^{32}$ and $R^{33}$ are each independently an alkylene group, aralkylene group, arylene group, alkylene-arylene-alkylene group, alkylsilylene group, or alkylgermylene group.)

Figure 6B:
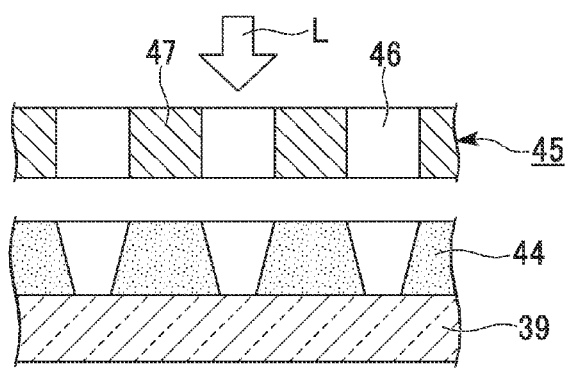
FIG. 6B is a vertical cross-sectional view illustrating the formation process, subsequent to the step of FIG. 6A, for the liquid crystal display device according to the first embodiment of the present invention.

Next, as shown in FIG. 6B, a stepper is used to irradiate the coating film 44 with light L via a photomask 45, to perform exposure (step S3 in FIG. 5). The stepper used at this step has an i line at a wavelength of 365 nm, an h line at a wavelength of 404 nm, and a g line at a wavelength of 436 nm. The exposure dose is set to 150 mJ/cm².

Figure 7:
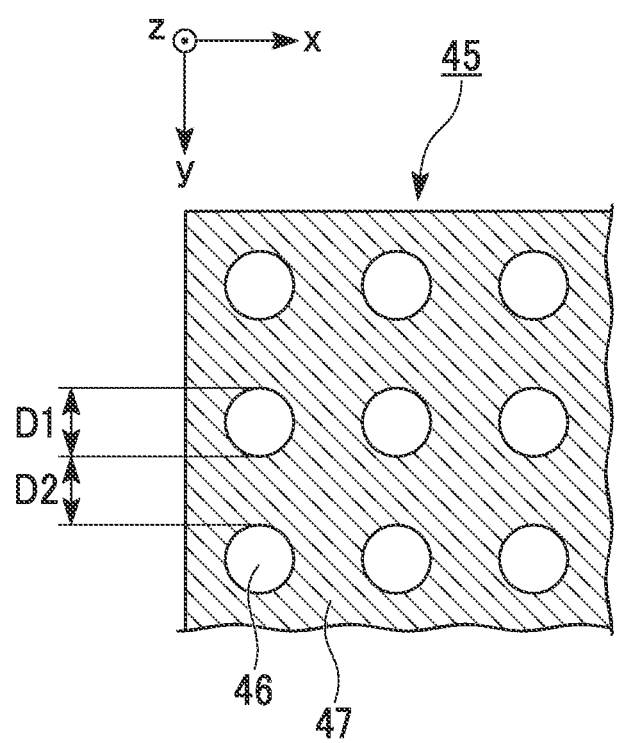
FIG. 7 is a plan view illustrating a photomask used in the formation process according to the first embodiment of the present invention.

FIG. 7 is a plan view that shows the photomask 45. The photomask 45, as shown in FIG. 7, is provided with a metal film made of chromium or the like on the surface of a quartz substrate or the like, the metal film being removed at a plurality of locations in the shape of circles. Of the photomask 45, regions in which the metal film does not exist are a plurality of light-passing portions 46, and the region in which the metal film exists is a light-blocking portion 47. The plurality of light-passing portions 46 are disposed in a two-dimensional arrangement, with uniform spacing therebetween in the x-axis direction and the y-axis direction. The plan-view shape of the photomask 45, as one example, is a square with one side being 2 cm, the diameter D1 of the light-passing portions 46 being 15 μm, and the distance D2 between neighboring light-passing portions 46 being 15 μm.

Figure 6C:
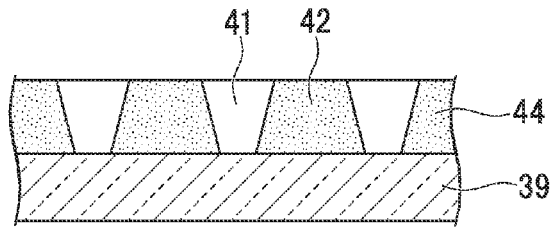
FIG. 6C is a vertical cross-sectional view illustrating the formation process, subsequent to the step of FIG. 6B, for the liquid crystal display device according to the first embodiment of the present invention.

As shown in FIG. 6B, when light L (combined i-h-g lines) is radiated via the photomask 45, of the coating film 44, the light L is selectively radiated onto parts that are directly below the light-passing parts 46, and light L is not radiated onto the part directly below the light-blocking part 47. When this is done, in the exposed regions that the light L strikes, a photochemical reaction progresses whereby the refractive index of the exposed regions is increased with respect to the refractive index before exposure. As a result, there occurs a difference in the refractive index between those regions and the unexposed region, with positions (exposed regions) corresponding to the light-passing parts 46 of the photomask 45 being the high refractive index portions 41. The positions (unexposed region) corresponding to the light-blocking portion 47 of the photomask 45 become the refractive index change layer 40 with the low refractive index portion 42. In this exposure process step, because the light L is absorbed by the coating film 44 proceeding in the depth direction from the surface of the coating film 44 and strength decreases, the photochemical reaction becomes sluggish, proceeding in the depth direction from the surface of the coating film 44. As a result, as shown in FIG. 6C, the surface area (horizontal cross-section) of the high refractive index portions 41 becomes smaller, proceeding from the surface of the coating film 44 in the depth direction, so that the high refractive index portions 41 have a so-called reversed-tapered shape.

Next, the base material 39 on which the above-noted refractive index change layer 40 has been formed is placed on a hotplate and heated for 5 minutes at a temperature of 130° C., so as to bake the refractive index change layer 40 (step S4 in FIG. 5).

Next, stabilization processing of the refractive index change layer 40 is performed (step S5 in FIG. 5). Specifically, a 20% dimethylformamide solution of 2,2,3,3,4,4,4-heptafluorobutyl oxirane (with 10 mol % tetrabutylammonium bromide added) heated to a temperature of 100° C. is used as a stabilizing agent, the base material 39 being immersed in this solution for 2 minutes, after which it is washed in super-pure water for one minute. Next, the above-described stepper is used to re-expose the overall surface of the refractive index change layer 40, without using a photomask, with an exposure dose of 300 mJ/cm². Next, an oven is used to heat the base material 39 on which the refractive index change layer 40 is formed for 15 minutes at a temperature of 150° C. Going through the above-noted process steps S1 to S5 in FIG. 5 completes the viewing angle widening film 7.

Figure 6D:
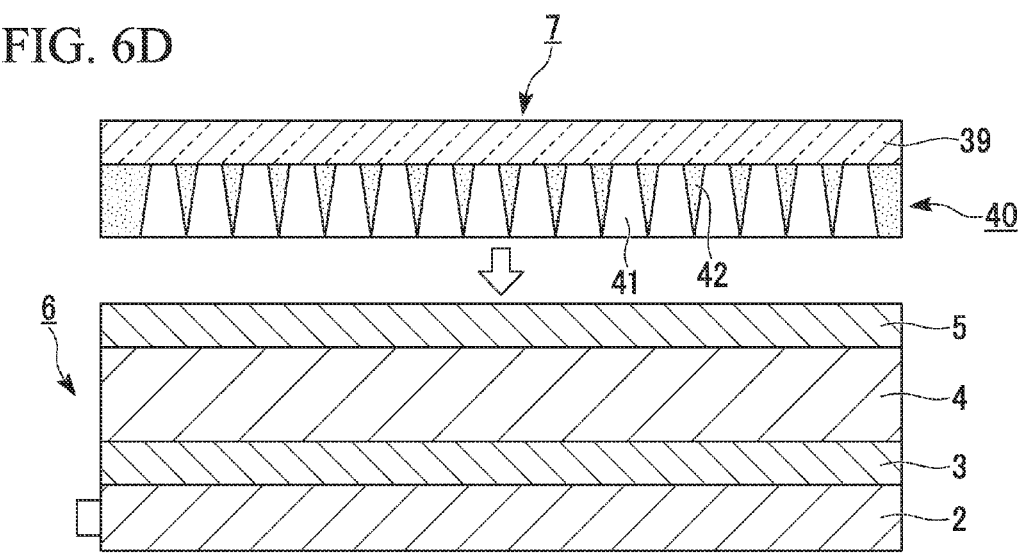
FIG. 6D is a vertical cross-sectional view illustrating the formation process, subsequent to the step of FIG. 6C, for the liquid crystal display device according to the first embodiment of the present invention.

Next, as shown in FIG. 6D, the completed viewing angle widening film 7 is adhered to the liquid crystal display element 6, using an optical adhesive or the like, with the base material 39 facing the viewing side and the refractive index change film 40 brought into opposition with the second polarizing sheet 5 (step S6 in FIG. 5).

By the above process step, the liquid crystal display device 1 of the present embodiment is completed.

At this point, the viewing angle widening effect of the viewing angle widening film 7 of the present embodiment will be described, using FIG. 8A and FIG. 8B.

Figure 8A:
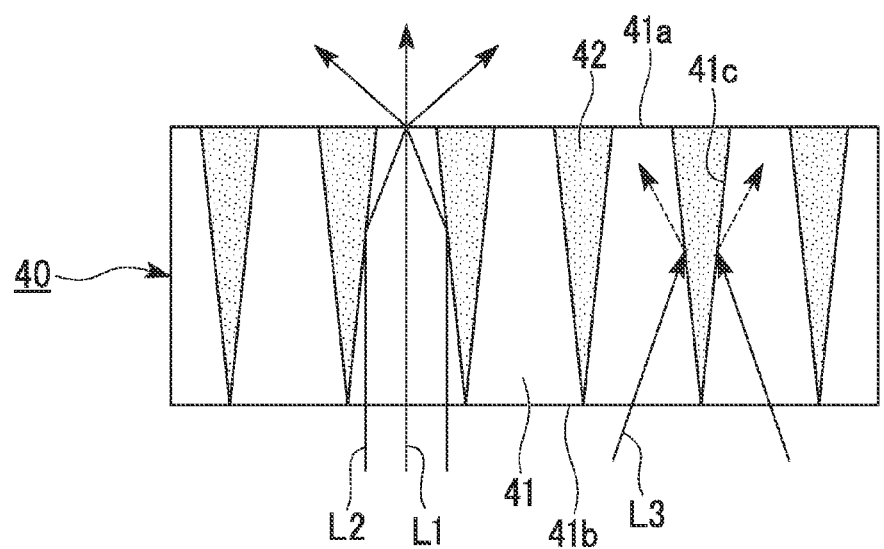
FIG. 8A is a schematic view for illustrating the action of a viewing angle widening film.
Figure 8B:
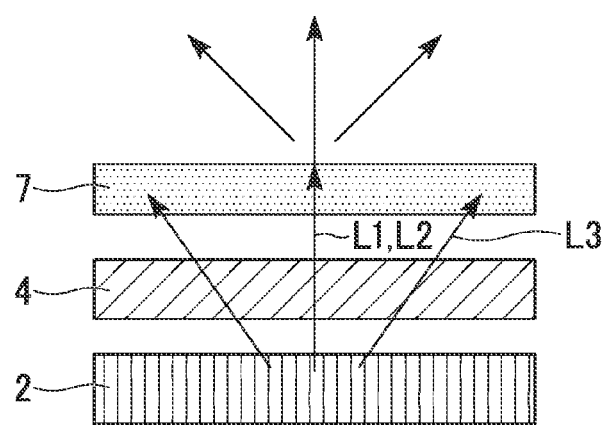
FIG. 8B is a schematic view for illustrating the action of a viewing angle widening film.

As shown in FIG. 8A, light which strikes the light incidence surface 41b in the vicinity of the center part of a high refractive index portion 41 of the refractive index change layer 40 substantially perpendicularly will be called L1. Of the light that exits from the liquid crystal display element 6 and is incident to the viewing angle widening film 7, light L1, without being totally reflected at the side surface 41c of the high refractive index portion 41, proceeds in a straight line as is, passing through the high refractive index portion 41. Also, at the peripheral edge part of the high refractive index portion 41 of the refractive index change layer 40, the light that is incident to the light incidence surface 41b substantially perpendicularly will be called L2. Because L2 strikes the high refractive index portion 41 at angle of incidence that is larger than the critical angle, it is totally reflected at the side surface 41c of the high refractive index portion 41. The totally reflected light subsequently is further refracted at the light emission surface 41a of the high refractive index portion 41, at a large angle with respect to the normal line direction of the light emission surface 41a. Light that strikes the light incidence surface 41b of the high refractive index portion 41 at an inclination will be called L3. Because L3 strikes the side surface 41c of the high refractive index portion 41 with an angle of incidence that is smaller than the critical angle, almost none of L3 is totally reflected, and it is strikes and is absorbed by the low refractive index portion 42.

By the action noted above, as shown in FIG. 8B, light L1 and L2, which strike the viewing angle widening film 7 substantially perpendicularly, exit from the viewing angle widening film 7 in a condition in which the angle distribution is wider than before they struck the viewing angle widening film 7. Therefore, even if viewing by an observer is inclined from the frontal direction (normal line direction) of the liquid crystal display element 6, it is possible to have a good view of the display. In the case of the present embodiment in particular, with the plan-view shapes of the high refractive index portions 41 being circular, because the angle distribution widens in all directions about the normal line direction of the screen of the liquid crystal display element 6 as the center, good viewing is possible from all directions. That is, using the viewing angle widening film 7, it is possible to widen the viewing angle of the liquid crystal display element 6. In contrast, the light L3 that strikes the viewing angle widening film 7 at an inclination is light that passes through the liquid crystal panel 4 at an inclination, this being light with a different retardation, which is light that is a cause of decreasing the so-called contrast of the display. If a light-absorbing property is imparted to the low refractive index portion 42 of the viewing angle widening film 7, it is possible to impart a function to the viewing angle widening film 7 of cutting such light and increasing the display contrast.

In the liquid crystal display device 1 of the present embodiment, as described above, the viewing angle widening film 7 is disposed over the second polarizing sheet 5 such that the refractive index change layer 40 side thereof faces the second polarizing sheet 5 and the base material 39 side thereof faces the viewing side. Therefore, the refractive index change layer 40 and the base material 39 are successively laminated over the second polarizing sheet 5, so that the constitution is one in which there is no space between these elements. Also, as seen from the viewing side, the refractive index change layer 40 is covered by the base material 39. By virtue of these constitutions, even if the liquid crystal display element 6 to which the viewing angle widening film 7 is adhered is subjected to some sort of mechanical shock in the manufacturing process, the refractive index change film 40 is protected by the base material 39, thereby preventing the occurrence of drop-out of or damage to the high refractive index portions 41 and low refractive index portion 42 that constitute the refractive index change layer 40. There is also no intrusion of dust and the like into the inside of the refractive index change layer 40.

In the method for adhering the protective film afterwards as described in Patent Reference 1, an adhesive is interposed between the refractive index change layer and the protective film. There is, therefore, the risk that when light exits from the refractive index change layer, it is absorbed by the adhesive, for example, resulting in light loss. In contrast, with the constitution of the present embodiment, the refractive index change layer 40 and the base material 39 are integrated as one, and there is no adhesive between the refractive index change layer 40 and the base material 39. Therefore, when light exits from the refractive index change layer 40, there is no light loss. Additionally, because the refractive index change layer 40 is covered by the base material 39, it is possible to prevent a deterioration of optical characteristics, such as a decrease in the reflectivity of the viewing angle widening film 7 with the passage of time, and to maintain the viewability of the display. As a result, the desired optical characteristics of the viewing angle widening film 7 are constantly maintained, and it is possible to achieve a stable viewing angle widening effect, enabling achievement of a liquid crystal display device that exhibits superior display viewability.

The method for forming the liquid crystal display device 1 according to the present embodiment includes the following process steps. A coating film 44 made of a refractive index changing composition, the refractive index of which changes when radiated by the light L, is formed. By selectively radiating the coating film 44 by the light L, the refractive index of the coating film 44 in the exposed region is changed, so as to form a refractive index change layer 40 having high refractive index portions 41 and a low refractive index portion 42. In the present method, therefore, the base material 39 that serves as an underlayer for forming the coating film 44 is essential. Also, with the present method, high refractive index portions 41, the surface area of the light incidence surface 41b thereof on the side opposite from the base material 39 is larger than the surface area of the light emission surface 41a thereof on the base material 39, are formed. In an arrangement in which a viewing angle widening film 7 film is used, it is necessary to dispose the light incidence surface 41b sides on the liquid crystal display element 6 side and to dispose the light emission surface 41a sides on the side (viewing side) opposite from the liquid crystal display element 6. When this is done, the base material 39 inevitably is positioned on the viewing side. If this disposition is made as is, without removing the base material 39 that is integrated as one with the refractive index change layer 40, the base material 39, which is essential in the forming process, functions as a protective material for protecting the refractive index change layer 40. Therefore, it is not necessary to prepare a separate protective material and have a process step to adhere the protective material afterwards. In this manner, according to the present method for manufacturing, it is possible by a simple forming method to provide the liquid crystal display device 1 that can reliably exhibit the effect of a widened viewing angle with low cost.

In terms of the dimensions of various parts in the present embodiment, the pitch of the high refractive index portions 41 in the refractive index change layer 40 (the center-to-center distance of neighboring high refractive index portions 41) is 30 μm. For example, if the pixel pitch in the liquid crystal panel 4 is 50 μm and the viewing angle widening film 7 of the present embodiment is used, it is desirable that the dimensions of various parts be set so that the pitch of the high refractive index portions 41 is smaller than the pixel pitch (center-to-center distance between neighboring pixels) of the liquid crystal panel 4. The reason for this is that, if this constitution is adopted, by disposing at least one high refractive index portion 41 within one pixel, the angle distribution of the light exiting each pixel is widened, thereby obtaining the effect of widening the viewing angle.

[Second Embodiment]

The second embodiment of the present invention will be described below, with references made to FIG. 9A and FIG. 9B.

The basic constitution of the liquid crystal display device of the present embodiment is the same as the first embodiment, the disposing of the high refractive index portions of the viewing angle widening film being different. Therefore, in the present embodiment, descriptions of the basic constitution of the liquid crystal display device will be omitted, and the viewing angle widening film will be described.

Figure 9A:
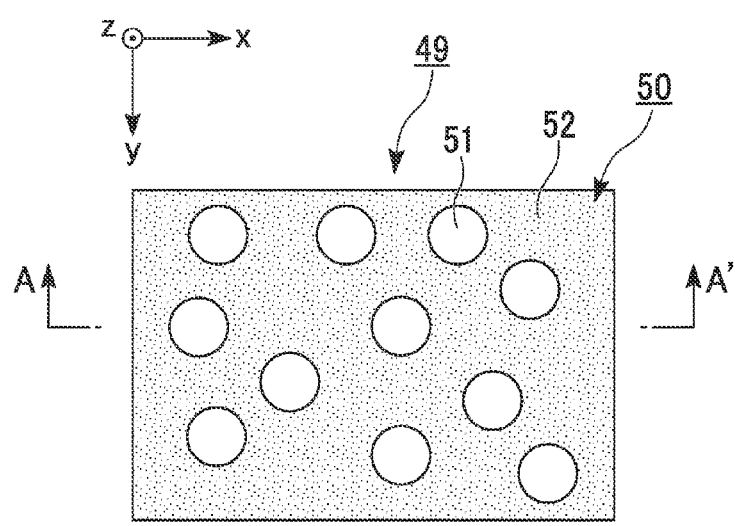
FIG. 9A is a plan view illustrating a viewing angle widening film according to a second embodiment of the present invention.
Figure 9B:
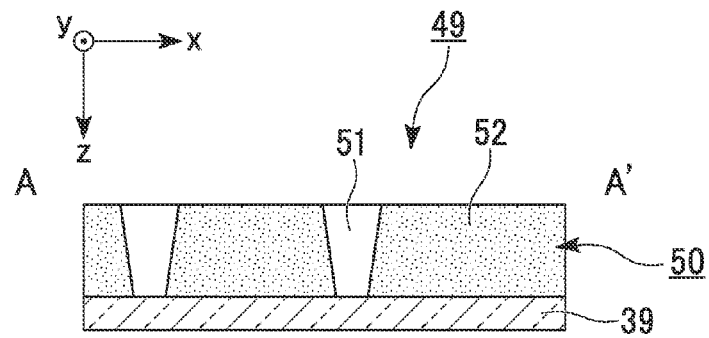
FIG. 9B is a vertical cross-sectional view, taken along the line A-A' in FIG. 9A, illustrating the viewing angle widening film according to the second embodiment of the present invention.

In FIG. 9A and FIG. 9B, constituent elements that are the same as in the drawings used for the first embodiment are assigned the same reference symbols, and the detailed descriptions thereof will be omitted.

In the first embodiment, the plurality of high refractive index portions of the refractive index change layer are arranged with a prescribed uniform spacing along the x direction and the y direction. In contrast, in the viewing angle widening film 49 of the second embodiment, as shown in FIG. 9A and FIG. 9B, although all of the high refractive index portions 51 of the refractive index change layer 50 have the same circular conical frustum shape, in contrast to the first embodiment, the pitch thereof is random (irregular), they being disposed in random positions. To adopt this disposition, the random disposition can be made by imparting fluctuations to the pitch and the disposition, using, for example, a random number table. The part other than the high refractive index portions 51 is a low refractive index portion 52. That is, the plurality of high refractive index portions 51 of the refractive index change layer 50 are not disposed regularly in the x axis direction and the y axis direction. The other features of the constitution are the same as the first embodiment.

In the present embodiment as well, the same effect as in the first embodiment, of maintaining the desired optical characteristics of the viewing angle widening film 49 and enabling a stable viewing angle widening effect, can be achieved.

In the case in which patterns that each exhibit regularity, such as stripes or a grid pattern are overlapped, if each pattern is shifted a bit, it is known that interference bands (moiré patterns) are observed. For example, in the case of the first embodiment, because a viewing angle widening film 7 on which a plurality of high refractive index portions 41 arranged in a matrix is overlapped with a liquid crystal panel 4 in which a plurality of pixels are arranged in a matrix, moiré occurs between the frequency pattern by the high refractive index portions 41 of the viewing angle widening film 7 and the frequency pattern of the pixels of the liquid crystal panel 4, thereby risking a degradation of the quality of the display.

In contrast, in the present embodiment, because the plurality of high refractive index portions 51 are randomly arranged, it is possible to avoid the occurrence of moiré.

In the present invention, even though the pitch of the high refractive index portions 51 is random, they cannot be increased in size without limitation. It is desirable that that dimensions of various parts be set so that the maximum pitch among the various pitches of the high refractive index portions 51 is smaller than the pitch of the pixels in the liquid crystal panel 4 (center-to-center distance of between neighboring pixels). The reason for this is that, if this setting is made, at least one high refractive index portion 51 will be positioned within one pixel, so that the angle distribution of the light exiting from each pixel is widened, thereby enabling the effect of widening the viewing angle.

[Third Embodiment]

The third embodiment of the present invention will be described below, with references made to FIG. 10A and FIG. 10B.

The basic constitution of the liquid crystal display device of the present embodiment is the same as the first embodiment, the dimensions and disposition of the high refractive index portions of the viewing angle widening film being different. Therefore, in the present embodiment, descriptions of the basic constitution of the liquid crystal display device will be omitted, and the viewing angle widening film will be described.

Figure 10A:
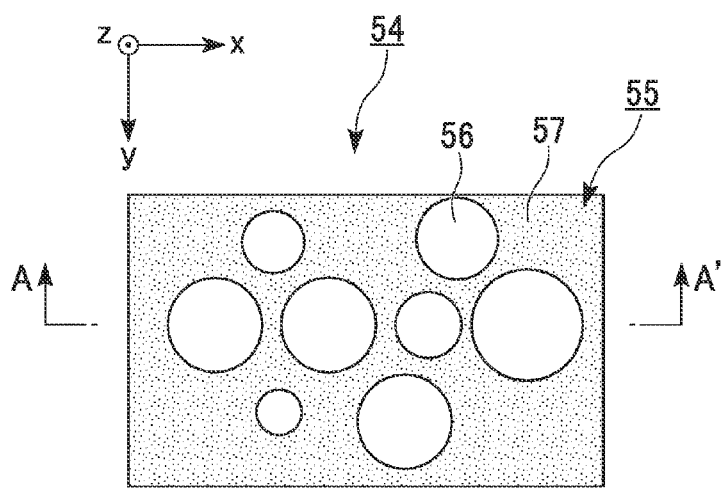
FIG. 10A is a plan view illustrating a viewing angle widening film according to a third embodiment of the present invention.
Figure 10B:
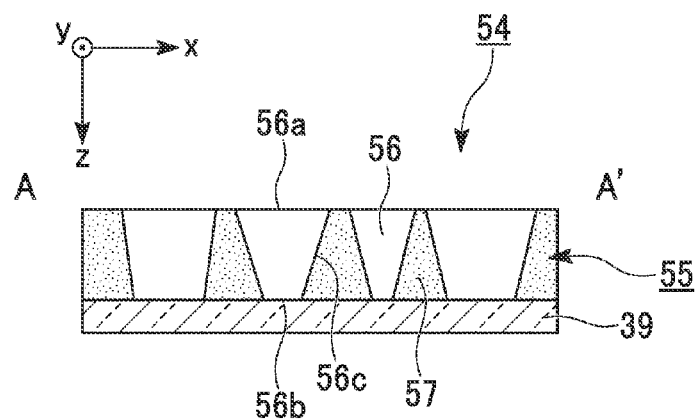
FIG. 10B is a vertical cross-sectional view, taken along the line A-A' in FIG. 10A, illustrating the viewing angle widening film according to the third embodiment of the present invention.

In FIG. 10A and FIG. 10B, constituent elements that are the same as in the drawings used for the first embodiment are assigned the same reference symbols, and the detailed descriptions thereof will be omitted.

In the first and second embodiments, the refractive index change layer includes a plurality of high refractive index portions that all have light incidence surfaces and light emission surfaces with the same dimensions (circle diameters) and that all have the same angle of side surface inclination (angle formed between the light emission surface and side surface). In contrast, in the viewing angle widening film 54 of the present embodiment, as shown in FIG. 10A, the plurality of high refractive index portions 56 of the refractive index change layer 55 are the same as in the first and second embodiments in that the shapes thereof are circular conical frustums. However, they differ in that the dimensions (circle diameters) of the light incidence surface 56b and the light emission surface 56a are different for each high refractive index portion 56. Additionally, in the plurality of high refractive index portions 56, as shown in FIG. 10B, the angle of inclination of the side surface 56c (angle formed between the light emission surface 56a and the side surface 56c) is different for each high refractive index portion 56. Although the plurality of high refractive index portions 56 having differing dimensions in this manner may be disposed in a regular manner, it is desirable that they be disposed randomly, as shown in FIG. 10A. The part other than the high refractive index portions 56 is the low refractive index portion 57. Other features of the constitution are the same as the first embodiment.

Formation of a viewing angle widening film 54 constituted as noted above, is possible in the process step shown as step S3 in FIG. 5, by using a photomask having a plurality of light-passing parts having differing dimensions and locally varying the angle of incidence of light emitted striking the refractive index change layer 55 above the base material 39 from the light source of the stepper. To achieve that, a method that may be adopted is one in which the base material 39 is fixed to a horizontal surface and the light source is inclined, the inclination thereof being varied with time as exposure is done. Another method that may be adopted is of holding the light source fixed and inclining the base material 39 from horizontal, the inclination thereof being varied with time as exposure is done. Alternatively a method may be adopted in which an optical system such as a lens is used to collimate the light emitted from the light source of the stepper, the collimation angle thereof being varied with time as exposure is done.

In the present embodiment as well, the same effect as in the first and second embodiments, of maintaining the desired optical characteristics of the viewing angle widening film and enabling a stable viewing angle widening effect, can be achieved.

As described above, light that strikes the refractive index change layer 55 is totally reflected at the side surface 56c of each of the high refractive index portions 56, and exits from the refractive index change layer 55 in the condition with the angle distribution wider than before its incidence. Thus, the angle distribution of light that exits from the refractive index change layer 55 is dependent upon the distribution of the angle of inclination of the side surfaces 56c of the high refractive index portions 56. For this reason, if the angle of inclination of the side surfaces of the high refractive index portions is made constant, as in the first and second embodiments, the luminance at a particular light exiting angle is increased, so that it is possible to view a brightened display at a particular observation angle. However, there is a risk that, if the display element is observed from a different angle, display variations are observed, depending upon the angle of observation.

In contrast to the above, according to the constitution of the present embodiment, because the angles of inclination of the side surfaces 56c of the plurality of high refractive index portions 56 mutually differ, the range of the total reflection angle of light can be widened because of the mutual compensation between the plurality of high refractive index portions 56 having side surfaces 56c with inclination angles that differ. As a result, when the liquid crystal display device is observed from different angles, the luminance changes smoothly in accordance with the observation angle, thereby enabling an improvement in the viewing angle characteristics.

Also, in the present embodiment, because the dimensions (circle diameters) of the light incidence surfaces 56b and the light emission surfaces 56a mutually differ and because there are a plurality of types of inclination angles of the side surfaces 56c of the high refractive index portions 56, the luminance changes smoothly. However, by just setting two types of dimensions and inclination angles so as to cause the above-noted dimensions and angles of inclination of at least a part of the high refractive index portions to be different than the other high refractive index portions, the effect of improving the viewing angle characteristics is achieved.

[Fourth Embodiment]

The fourth embodiment of the present invention will be described below, using FIG. 11A and FIG. 11B.

The basic constitution of the liquid crystal display device of the present embodiment is the same as the first embodiment, the shape of the high refractive index portions of the viewing angle widening film being different from the first embodiment. Therefore, in the present embodiment, descriptions of the basic constitution of the liquid crystal display device will be omitted, and the viewing angle widening film will be described.

Figure 11A:
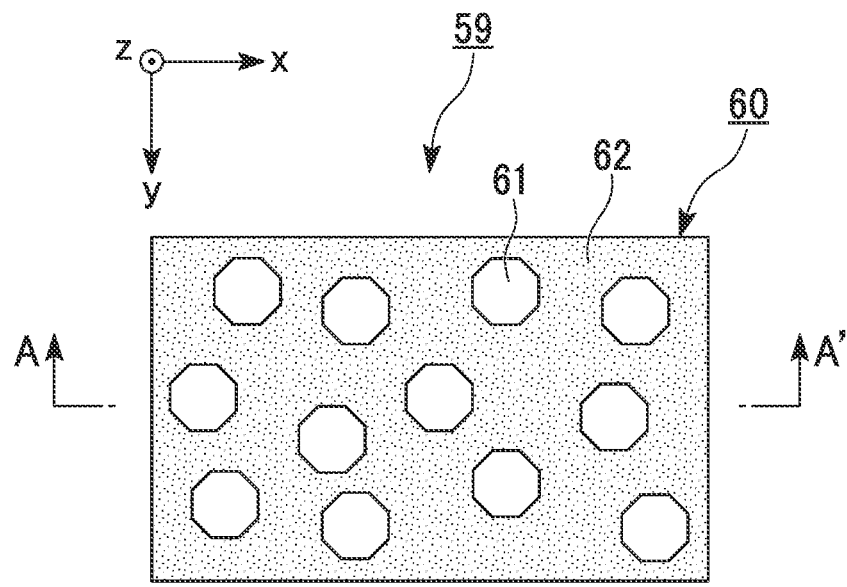
FIG. 11A is a plan view illustrating a viewing angle widening film according to a fourth embodiment of the present invention.
Figure 11B:
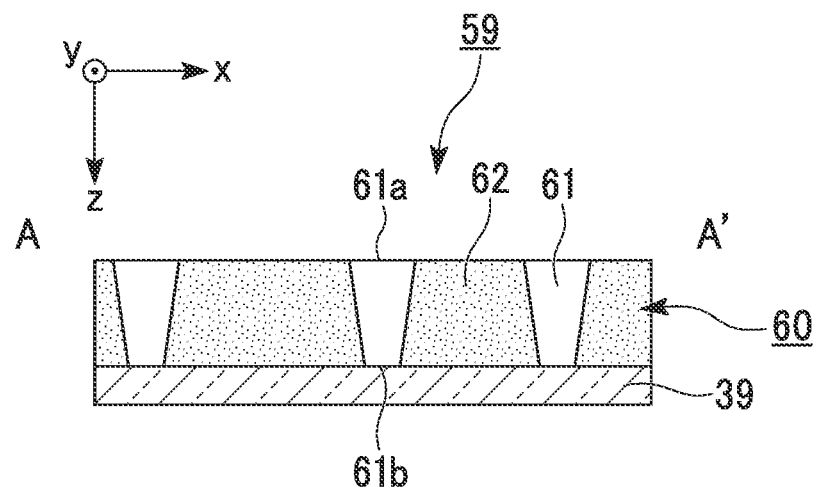
FIG. 11B is a vertical cross-sectional view, taken along the line A-A' in FIG. 11A, illustrating the viewing angle widening film according to the fourth embodiment of the present invention.

In FIG. 11A and FIG. 11B, constituent elements that are the same as in the drawings used for the first embodiment are assigned the same reference symbols, and the detailed descriptions thereof will be omitted.

In the first to third embodiments, each of the high refractive index portions of the viewing angle widening film included a reverse-tapered circular conical frustum shape and both the light incidence surface and the light emission surface thereof are circular. In contrast, in the viewing angle widening film 59 of the present embodiment, each of the high refractive index portions 61 of the refractive index change layer 60, as shown in FIG. 11A and FIG. 11B, are reverse-tapered polygonal conical frustums. The planar shapes of both the light incidence surface 61b and the light emission surface 61a are octagonal. Of the eight sides of the octagons, which are the planar shapes of each of the high refractive index portions 61, the four sets of two sides each that are mutually parallel are disposed so that the face a direction parallel to the x axis, a direction parallel to the y axis, a direction making an angle of 45° with the x axis (counterclockwise rotation from the x axis being taken as a positive angle), and a direction making an angle of 135° with the x axis.

Although the plurality of high refractive index portions 61 may be disposed in a regular manner, it is desirable that they be disposed randomly, as shown in FIG. 11A. The part other than the high refractive index portions 61 is the low refractive index portion 62. Other features of the constitution are the same as the first embodiment. In order to fabricate a viewing angle widening film 59 having the above-noted constitution, in the exposure step shown as step S3 in FIG. 5, a photomask having octagonal light-passing parts can be used.

In the present embodiment as well, the same effect as in the first to third embodiments, of maintaining the desired optical characteristics of the viewing angle widening film and enabling a stable viewing angle widening effect, can be achieved.

According to the first to third embodiments, because the planar shapes of the high refractive index portions are circular, light is diffused in all directions about a center that is the normal line direction of the liquid crystal element 6, thereby exhibiting a viewing angle widening effect in all directions. In contrast, according to the present embodiment, because the above-described four sets of sides are, respectively, facing a direction parallel to the x axis, a direction parallel to the y axis, a direction that makes an angle of 45° with the x axis, and a direction that makes an angle of 135° with the x axis, the diffusion of light is centered on the above-noted four directions. For this reason, the effect that is exhibited is that of widening of the viewing angle in the horizontal direction, the vertical direction and an inclined direction relative to the screen, which are particularly important for the viewing angle characteristics of a liquid crystal display device. The shape of the high refractive index portions 61 is not restricted to being octagonal, and may be another type of polygon, in which case, because the diffusion of light is centered on particular directions in accordance with the shape of the polygon, it is possible to provide a liquid crystal display device that exhibits viewing angle widening in particular observation directions.

[Fifth Embodiment]

The fifth embodiment of the present invention will be described below, using FIG. 12 and FIG. 13A to FIG. 13D.

The basic constitution of the liquid crystal display device of the present embodiment is the same as the first embodiment, the constitution of the viewing angle widening film being different from the first embodiment. Therefore, in the present embodiment, descriptions of the basic constitution of the liquid crystal display device will be omitted, and the viewing angle widening film will be described.

In FIG. 12 and FIG. 13A to FIG. 13D, constituent elements that are the same as in the drawings used for the first embodiment are assigned the same reference symbols, and the detailed descriptions thereof will be omitted.

Figure 12:
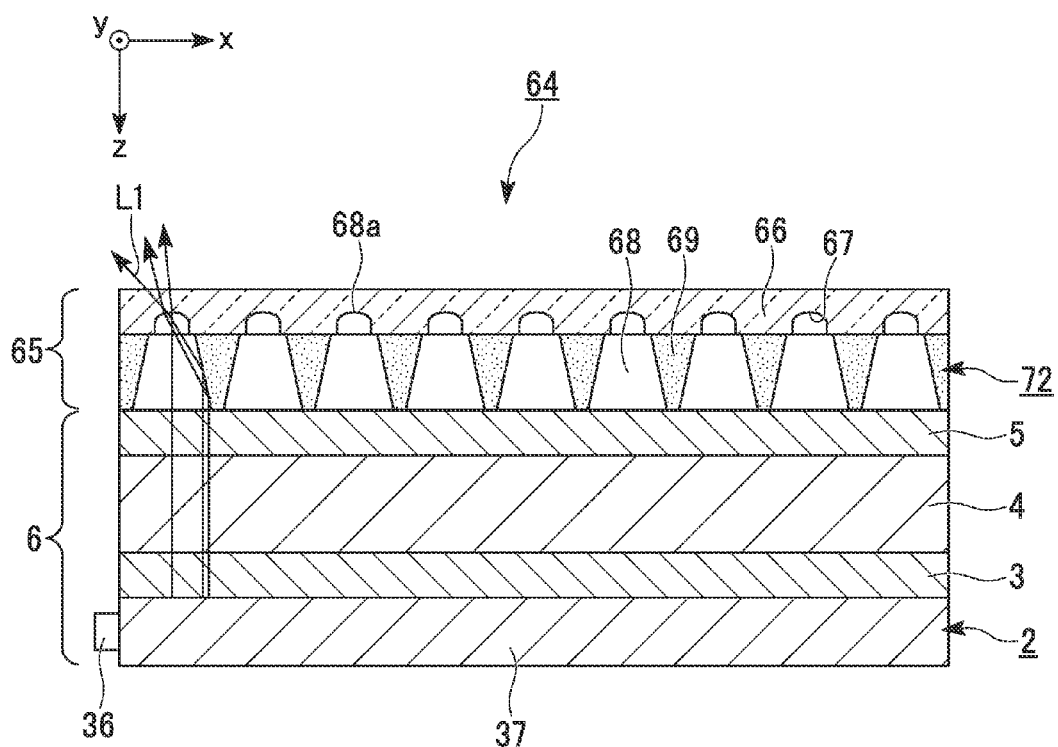
FIG. 12 is a vertical cross-sectional view illustrating a viewing angle widening film according to a fifth embodiment of the present invention.

In the liquid crystal display device 64 of the present embodiment, as shown in FIG. 12, one surface of the base material 66 of the viewing angle widening film 65 is not planar, but rather has formed thereon a plurality of depressions 67. The depressions 67 of the base material 66 are formed at positions corresponding to each of the high refractive index portions of the refractive index change layer 72. The inside of the depressions 67 is filled with the organic material constituting the high refractive index portions 68 and formed as one with the high refractive index portions 68. The inner surfaces of the depressions 67 are curved surfaces. A part of the light emission surface 68a of the high refractive index portions 68 is formed as convex curved that reflects the shape of the depressions 67. As will be described later, the convex surfaces function to diffuse light, acting as lenses when light exits from the high refractive index portions 68. In the same manner as in the above-noted embodiment, although the plurality of high refractive index portions may be disposed in a regular manner, it is desirable that they be randomly disposed. The part other than the high refractive index portions is the low refractive index portion 69. Other features of the constitution are the same as the first embodiment.

Figure 13A:
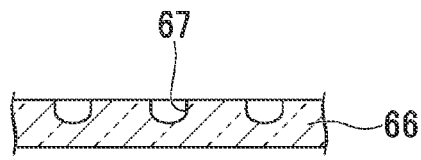
FIG. 13A is a vertical cross-sectional view illustrating the formation process for the liquid crystal display device according to the fifth embodiment of the present invention.

To form a viewing angle widening film 65 having the above-noted constitution as shown in FIG. 13A, depressions 67 are formed at positions on the surface of the base material 66 of the high refractive index portions 68 that will be formed later. When forming the depressions 67, the following process step, for example, is used. Photoresist (not shown) is coated onto the base material 66. The photoresist is exposed through a mask and developing is done, so as to form a resist pattern having apertures at the parts at which the depressions 67 will be formed. The base material 66 can then be etched via the resist pattern. When this is done, by using, for example anisotropic etching, it is possible to form the depressions 67 so that the inner surfaces are curved surfaces.

The subsequent process steps are the same as in the first embodiment.

Figure 13B:
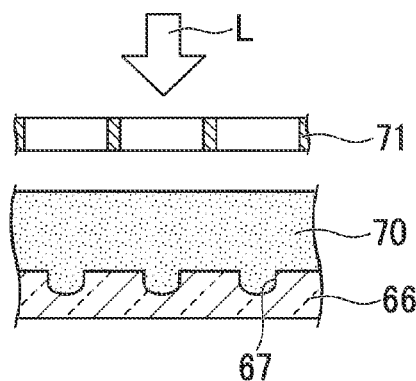
FIG. 13B is a vertical cross-sectional view illustrating the formation process, subsequent to the step of FIG. 13A, for the liquid crystal display device according to the fifth embodiment of the present invention.
Figure 13C:
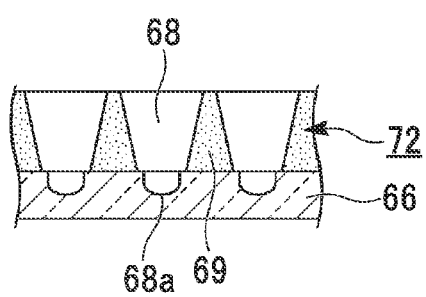
FIG. 13C is a vertical cross-sectional view illustrating the formation process, subsequent to the step of FIG. 13B, for the liquid crystal display device according to the fifth embodiment of the present invention.

Specifically, as shown in FIG. 13B, a refractive index changing composition solution is coated over the base material 66 in which the depressions 67 have been formed, thereby forming the coating film 70. The coating film 70 is then pre-baked. Light L is radiated onto the coating film 70 via a photomask 71 so as to perform exposure thereof. By doing this, as shown in FIG. 13C, a refractive index change layer 72 is formed that includes high refractive index portions 68 at which a part of the light emission surfaces 68a are convex surfaces, and a low refractive index portion.

Figure 13D:
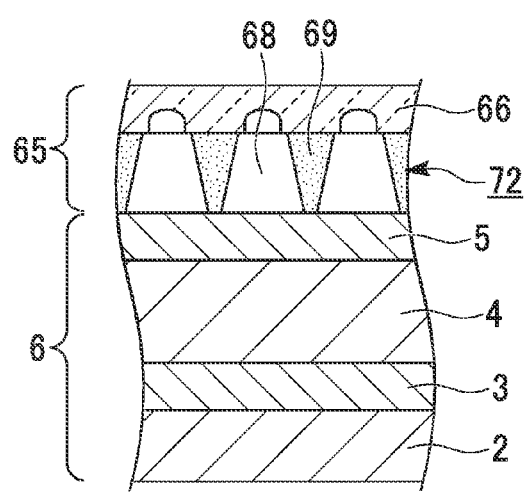
FIG. 13D is a vertical cross-sectional view illustrating the formation process, subsequent to the step of FIG. 13C, for the liquid crystal display device according to the fifth embodiment of the present invention.

Next, the above-noted refractive index change layer 72 is baked and subjected to stabilization processing. As shown in FIG. 13D, the completed viewing angle widening film 65 attached over the second polarizing sheet 5 of the liquid crystal element 6, with the base material 66 facing the viewing side.

In the present embodiment as well, the same effect as in the first to fourth embodiments, of maintaining the desired optical characteristics of the viewing angle widening film 65 and enabling a stable viewing angle widening effect, can be achieved.

According to the present embodiment, as shown in FIG. 12, because a part of the light emission surfaces 68a of the high refractive index portions 68 is a curved convex surface, the convex surfaces of the light emission surfaces 68a of the high refractive index portions 68 act as lenses, so as to refract the light L1 exiting from the high refractive index portions 68.

As a result, the light diffusion characteristics of the viewing angle widening film 65 are improved, and the viewing angle widening effect is further improved.

In place of the constitution of the present embodiment, protrusions having surfaces that are curved surfaces may be formed on a surface of the base material, and a viewing angle widening film that has concave surfaces on part of the light emission surface of the high refractive index portions that are curved to reflect the protrusions. In the case of this constitution as well, because the concave surface parts of the light emission surfaces of the high refractive index portions act as lenses, it is possible to improve the light diffusion characteristics of the viewing angle widening film and improve the viewing angle widening effect thereof.

[Sixth Embodiment]

The sixth embodiment of the present invention will be describe below, using FIG. 14.

The basic constitution of the liquid crystal display device of the present embodiment is the same as the first embodiment, the provision of a touch panel being different from the first embodiment. Therefore, in the present embodiment, descriptions of the basic constitution of the liquid crystal display device will be omitted, and the touch panel will be described.

Figure 14:
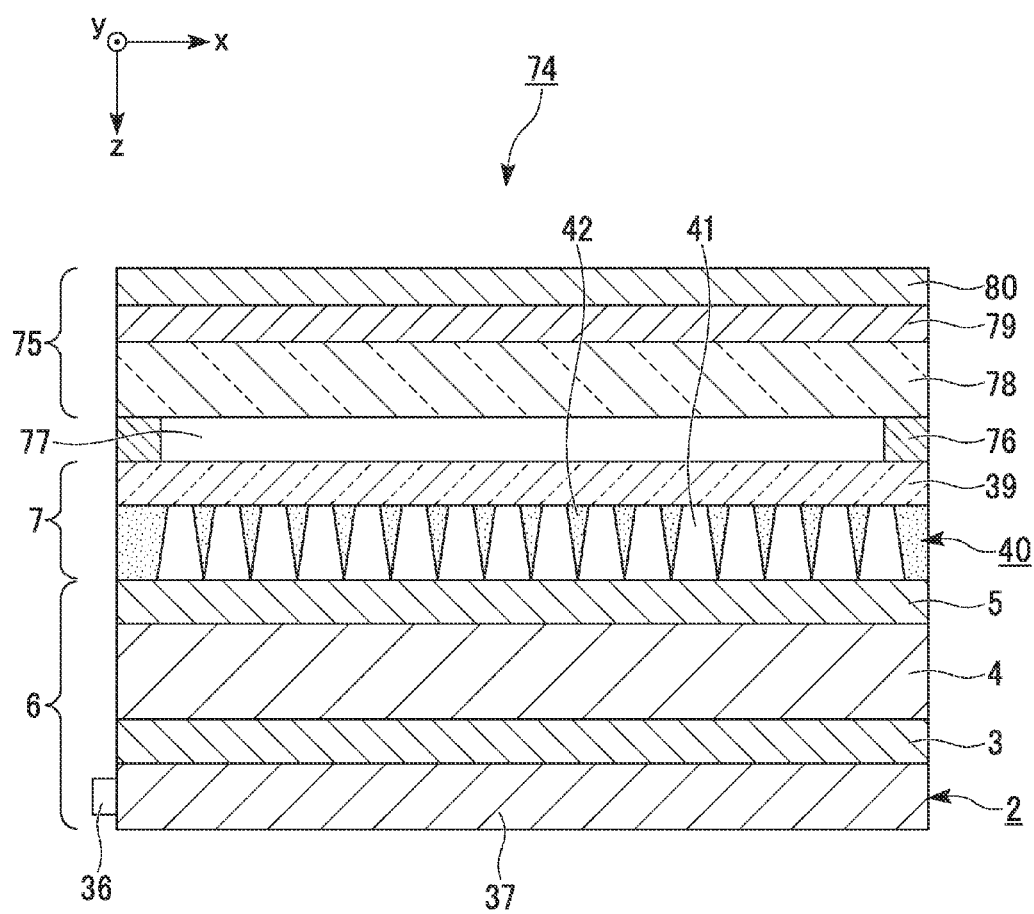
FIG. 14 is a vertical cross-sectional view illustrating a liquid crystal display device according to a sixth embodiment of the present invention.

In FIG. 14, constituent elements that are the same as in the drawings used for the first embodiment are assigned the same reference symbols, and the detailed descriptions thereof will be omitted.

In the liquid crystal display device 74 of the present embodiment, as shown in FIG. 14, the constitution from the backlight 2 up to the viewing angle widening film 7 is the same as in the first embodiment. A touch panel 75 (information input device) is disposed on the viewing side of the base material 69 of the viewing angle widening film 7. In the description to follow, the base material 39 of the viewing angle widening film 7 will be referred to as the "viewing angle widening film base material." The touch panel 75 is adhered over the viewing angle widening film base material 39 by an adhesive 76, such as double-sided tape, around the peripheral part of the viewing angle widening film base material 39. A gap is formed between the touch panel 5 and the viewing angle widening film base material 39 that is the thickness of the adhesive 76. That is, an air layer 77 is formed between the touch panel 75 and the viewing angle widening film base material 39.

The touch panel 75 includes a base material 78, a position detection electrode 79 and an overcoating layer 80. In the description to follow, the base material 78 of the touch panel 75 will be referred to as the "touch panel base material." On one surface of the touch panel base material 78, a position detection electrode 79, made of a transparent conductive material such as ITO or ATO (antinomy-doped tin oxide) is formed. The position detection electrode 79 is formed by sputtering ITO, ATO or the like, and has a sheet resistance of several hundred Ω/square to approximately 2 kΩ/square. An overcoating layer 80 made of an insulating material such as a silicon oxide film or glass is formed over the touch panel 79. The overcoating layer 80 is used to achieve resistance to scuffing of the position detection electrode 79.

In the present embodiment, a capacitive-type touch panel 75 is used. In the capacitive-type touch panel 75, for example, a minute voltage is applied to the four corners of the position detection electrode 79 as seen in plan view. When an arbitrary position on the position detection electrode 79 is touched by a finger via the overcoating 80, the point touched by the finger is grounded via the capacitance of the human body. As a result, the voltages at each of the corners change in accordance with the value of resistance between the contact point and the four corner parts. A position detection circuit measures the voltage changes as current changes and, from the measured values, detects the point of contact, that is, detects the position of contact by the finger.

The touch panel applied to the present embodiment is not restricted to being a capacitive-type touch panel, and may alternatively be a resistive-type, an ultrasonic-type, an optical-type, or another arbitrary type of touch panel.

According to the liquid crystal display device 74 of the present embodiment, because the viewing angle widening film 7 is provided in the same manner as in the first embodiment, the viewing angle characteristics are superior, and it is possible to achieve a liquid crystal display device with an additional information input function. For example, by a user touching the touch panel 75 using a finger or a pen while observing an image at a wide viewing angle, it is possible to input information with interaction with an information processing apparatus or the like.

[Seventh Embodiment]

The seventh embodiment of the present invention will be described below, using FIG. 15 and FIG. 16A to FIG. 16D.

The basic constitution of the liquid crystal display device of the present embodiment is the same as the sixth embodiment, and the present embodiment is also a liquid crystal display device provided with a touch panel.

The difference of the present embodiment with respect to the sixth embodiment is that a single base material serves as both the viewing angle widening film base material and the touch panel base material. Therefore, in the present embodiment, descriptions of the basic constitution of the liquid crystal display device will be omitted, the parts that are different being described.

In FIG. 15 and FIG. 16A to FIG. 16D, constituent elements that are the same as in the drawings used for the sixth embodiment are assigned the same reference symbols, and the detailed descriptions thereof will be omitted.

Figure 15:
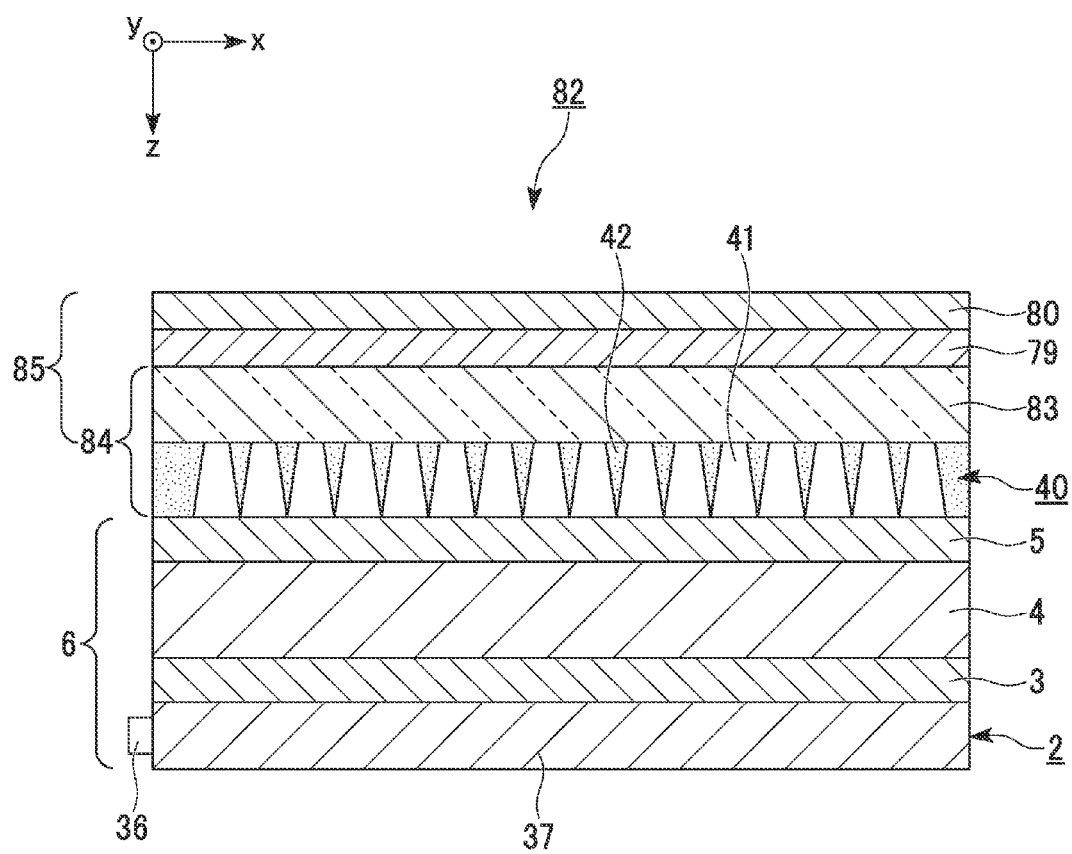
FIG. 15 is a vertical cross-sectional view illustrating a liquid crystal display device according to a seventh embodiment of the present invention.

In the liquid crystal display device 82 of the present embodiment, as shown in FIG. 15, is provided, on the viewing side of the refractive index change layer 40, with a base material 83 that serves as both the viewing angle widening film base material and the touch panel base material. In the description to follow, the base material 83 that serves as the viewing angle widening film base material and the touch panel base material is referred to simply as the "base material." The position detection electrode 79 and the overcoating layer 80 are successively formed, starting from the base material 83 side, on the surface of the side of the base material 83 that is opposite from the side on which the refractive index change layer 40 is formed.

Stated differently, in the constitution of the present embodiment, the refractive index change layer 40 is directly formed on the surface on the side of the base material 83 of the touch panel 85 that is opposite from the side on which the position detection electrode 79 and the overcoating layer 80 are formed or, alternatively, the position detection electrode 79 and the overcoating layer 80 are directly formed on the surface of the side of base material 83 of the viewing angle widening film 84 that is opposite from the side on which the refractive index change layer 40 is formed. Because, in this manner, in the present embodiment the touch panel 85 and the viewing angle widening film 84 are integrated as one, the adhesive 76 and one of the viewing angle widening film base material 39 and the touch panel base material 78 shown in the constitution of FIG. 14 of the sixth embodiment is not required.

When manufacturing the liquid crystal display device 82 having the above-noted constitution, as shown in FIG. 16, for example, sputtering is used to deposit a transparent conductive film make of ITO, ATO, or the like onto the base material 83, thereby forming the position detection electrode 79. Next, an insulating film made of silicon oxide, glass, or the like is deposited over the position detection electrode 79, thereby forming the overcoating layer 80.

Figure 16A:
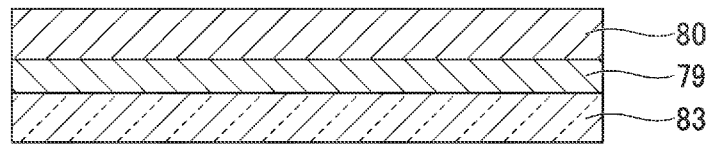
FIG. 16A is a vertical cross-sectional view illustrating the formation process for the liquid crystal display device according to the seventh embodiment of the present invention.
Figure 16B:
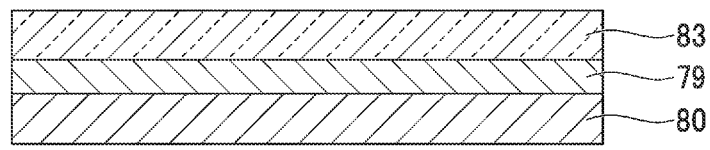
FIG. 16B is a vertical cross-sectional view illustrating the formation process, subsequent to the step of FIG. 16A, for the liquid crystal display device according to the seventh embodiment of the present invention.

Next, the base material 83 onto which the position detection electrode 79 and the overcoating layer 80 have been formed is turned around, as shown in FIG. 16B.

Figure 16C:
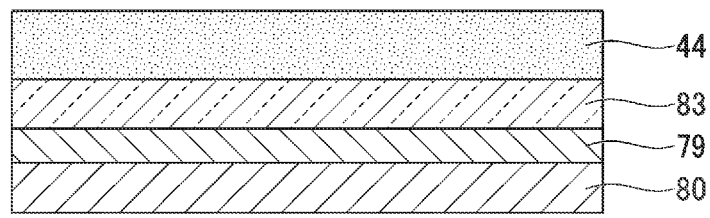
FIG. 16C is a vertical cross-sectional view illustrating the formation process, subsequent to the step of FIG. 16B, for the liquid crystal display device according to the seventh embodiment of the present invention.
Figure 16D:
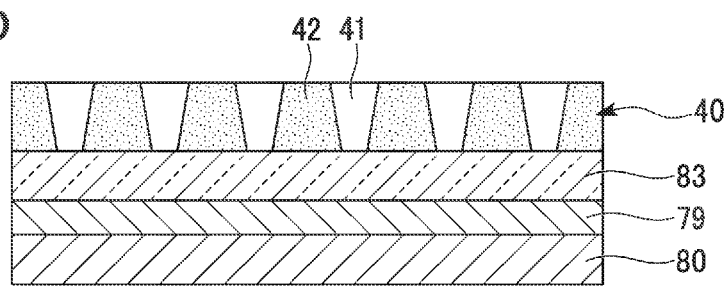
FIG. 16D is a vertical cross-sectional view illustrating the manufacturing process, subsequent to the step of FIG. 16C, for the liquid crystal display device according to the seventh embodiment of the present invention.
Figure 17:
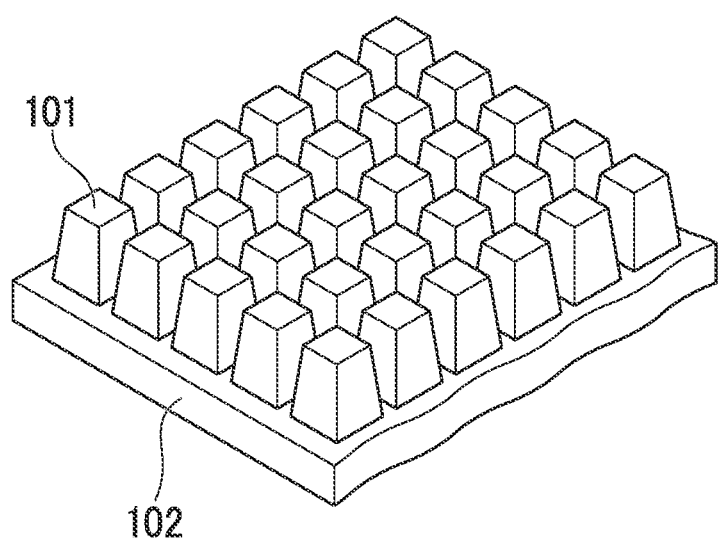
FIG. 17 is a perspective view illustrating an example of a conventional waveguide array.

Next, as shown in FIG. 16C, a refractive index changing composition solution is coated onto the surface of the base material 83 on the side opposite from the side on which the position detection electrode 79 and the overcoating 80 are formed, so as to form the coating film 44. Next, after pre-baking the coating film 44, the coating film 44 is irradiated with light through a photomask so as to perform exposure. By doing this, as shown in FIG. 16D, a refractive index change layer 40 is formed that includes high refractive index portions 41 having reverse-taper shapes and the low refractive index portion 42.

Next, after subjecting the above-noted refractive index change layer 40 to baking and stabilization processing, the refractive index change layer 40 is brought into opposition to the second polarizing sheet 5 and adhered to the second polarizing sheet 5 of the liquid crystal element 6, with the touch panel 85 facing the viewing side.

The above process steps complete the liquid crystal display device 82 of the present embodiment as shown in FIG. 15.

In the liquid crystal display device 82 of the present embodiment as well, because of providing a viewing angle widening film 84 similar to in the first embodiment, the same effect as in the sixth embodiment, of superior viewing angle characteristics, to which is added information input functionality, is achieved. Also, because compared with the constitution of the sixth embodiment shown in FIG. 14, there is a reduction of one base material, and the adhesive 76 is not required, it is possible to reduce the manufacturing cost. Additionally, compared to the constitution of the sixth embodiment, it is possible to make the liquid crystal display device thinner by the thicknesses of one base material and the adhesive.

Additionally, the technical scope of the present invention is not restricted to the above-described embodiment, and encompasses various changes thereto, without departing from the scope of the spirit of the present invention. For example, although in the above-described embodiments a liquid crystal display device is given as an example of the display element, this is not a restriction, and application is possible of these embodiments to an organic electroluminescent display device, a plasma display, or the like.

Also, although the above-described embodiments show the example in which the viewing angle widening film is adhered over the second polarizing sheet of the liquid crystal display device, the viewing angle widening film and the liquid crystal element need not be in contact with one another.

For example, another optical film or optical component or the like can be inserted between the viewing angle widening film and the liquid crystal element. Alternatively, the viewing angle widening film and the liquid crystal element may be positioned separated from each other. Also, in the case of an organic electroluminescence display device or a plasma display or the like, because the polarizer sheet is not required, the viewing angle widening film is not adhered together with a polarizing sheet.

A constitution may be adopted in which at least one of an anti-reflection layer, a polarizing filter layer, an anti-static layer, an anti-glare treated layer, and an anti-contamination treated layer is provided on the viewing same of the base material of the viewing angle widening film. According to this constitution, it is possible to impart various functions, such as the function of reducing reflection of external light, the function of preventing the attachment of dust and contamination, and the function of preventing damage, in accordance with the type of layer provided on the viewing side of the base material.

Also, although in the above-described embodiments the high refractive index portions had shapes that were circular conical frustums or polygonal conical frustums, this is not a restriction. The angle of inclination of the side surfaces of the high refractive index portions need not be symmetrical about the optical axis as the center. If, as in the above-noted embodiments, the shapes of the high refractive index portions are made circular conical frustum shapes or polygonal conical frustum shapes, because the inclination angle of the side surfaces of the high refractive index portions is symmetrical about the optical axis as the center, an angle distribution that is symmetrical about the optical axis as the center is obtained. In contrast, if there is a need to intentionally have an asymmetrical angle distribution, depending upon the application or manner of use of the display device, for example, if there is a desire to widen the viewing angle of only the top or the right side of the screen, the angles of inclination of the side surfaces of the high refractive index portions need not be symmetrical.

Also, in the case of high refractive index portions that are polygonal conical frustums, the side surfaces of the high refractive index portions need not be flat surfaces. They can be overall curved surfaces, or a mixture of flat and curved surfaces. If at least a part of the side surfaces of the high refractive index portions are made curved surfaces, it is possible to have a smooth angle distribution.

Additionally, the specific constitutional features, such as the disposition and shape of the high refractive index portions in the refractive index change layer, the dimensions and materials of various parts of the viewing angle widening film, and the manufacturing conditions in the manufacturing process, are not restricted to the above-noted embodiments, and can be subjected to appropriate modification.

Industrial Applicability

The embodiments of the present invention can be used in various types of display devices, such as liquid crystal display devices, organic electroluminescence display devices, and plasma displays.

Reference Signs List 1, 74, 82 Liquid crystal display device (display device)
6 Liquid crystal display element (display element)
7, 49, 54, 59, 65, 84 Viewing angle widening film (viewing angle widening member)
39, 66, 83 Base material
40, 50, 55, 60, 72 Refractive index change layer
41, 51, 56, 61, 68 High refractive index portion
41a, 56a, 61a, 68a Light emission surface
41b, 56b, 61b Light incidence surface
41c, 56c Side surface
42, 52, 57, 62, 69 Low refractive index portion
67 Depression
75, 85 Touch panel (information input device)

The invention claimed is:

1. A display device comprising:
a display element that makes a display; and
a viewing angle widening member that is provided on a viewing side of the display element, and that causes light to exit in a condition in which the angle distribution is widened relative to before incidence of the viewing angle widening member to the display element;
wherein the viewing angle widening member includes a base material and a refractive index change layer formed over the base material,
wherein the refractive index change layer includes a plurality of high refractive index portions and a low refractive index portion having a refractive index that is lower than the refractive index of the high refractive index portions;
wherein each of the plurality of high refractive index portions has a light emission surface on the base material side, and a light incidence surface having a larger surface area than that of the light emission surface on the side opposing the base material side,
wherein the light incidence surfaces of the plurality of high refractive index portions are separated from each other,
wherein the refractive index change layer faces the display element, and
wherein the base material is disposed on a display side.

2. The display device according to claim 1, wherein a planar disposition of the plurality of high refractive index portions as seen from the normal line direction of the refractive index change layer is random.

3. The display device according to claim 1, wherein of the plurality of high refractive index portions in the refractive index change layer, the angle of inclination of a side surface of at least one of the high refractive index portions is different than the angle of inclination of the other side surfaces of the high refractive index portions.

4. The display device according to claim 1, wherein the display element includes a plurality of pixels that form a displayed image,
wherein the plurality of high refractive index portions are disposed in the refractive index change layer with a uniform spacing, and
wherein the pitch of the high refractive index portions in the refractive index change layer is smaller than the pitch of the pixels of the display element.

5. The display device according to claim 1, wherein the display element includes a plurality of pixels that form a displayed image,
wherein the plurality of high refractive index portions are disposed randomly in the refractive index change layer, and
wherein the maximum pitch of the high refractive index portions in the refractive index change layer is smaller than the pitch of the pixels in the display element.

6. The display device according to claim 1, wherein a planar shape of the high refractive index portions as seen from the normal line direction of the refractive index change layer is circular or polygonal.

7. The display device according to claim 1, wherein depressions, the inner surfaces of which are curved surfaces, or protrusions, the surfaces of which are curved surfaces are formed so as to correspond to the positions of the light emission surface of the high refractive index portions, and
wherein the light emission surfaces of the high refractive index portions have curved convex surfaces or curved concave surfaces that reflect the shape of the depressions or the protrusions.

8. The display device according to claim 1, further comprising:
an information input device provided on the viewing side of the viewing angle widening member.

9. The display device according to claim 8, wherein the base material functions as the base material of the information input device.

10. The display device according to claim 1, wherein at least one of an anti-reflection layer, a polarizing filter layer, an anti-static layer, an anti-glare treated layer, and an anti-contamination treated layer is provided on the viewing side of the base material.

11. A method for forming a display device, the method comprising:
forming on one surface of a base material a coating film made of a refractive index changing composition that has photosensitivity, and that changes its refractive index by being radiated with light;
selectively radiating combined i-h-g lines onto a part of the coating film to change the refractive index of the coating film in exposed regions and cause the refractive index in the exposed regions and the unexposed regions to be different, so as to form on one surface of the base material a refractive index change layer having a high refractive index portion and a low refractive index portion, so as to form a viewing angle widening member made of the base material and the refractive index change layer; and
disposing the viewing angle widening member over the display element in the condition in which the refractive index change layer is caused to oppose the display element, with the base material side facing the display side.

12. The method for forming the display device according to claim 11, wherein when radiating the combined i-h-g lines, the refractive index changing composition that is used is a composition having characteristics wherein the refractive index of an exposed region is higher than the refractive index of an unexposed region.

* * * * *